United States Patent
Broadhead et al.

(10) Patent No.: US 8,631,607 B2
(45) Date of Patent: Jan. 21, 2014

(54) WINDOW REGULATOR ASSEMBLY FOR A VEHICLE

(75) Inventors: Douglas G. Broadhead, Brampton (CA); Raymond Edward Fortin, Newmarket (CA); Traian Miu, Oakville (CA); Thomas Mellary, Aurora (CA); James J. Ferri, Aurora (CA); Donald Harry Smith, Highland, MI (US)

(73) Assignee: Magna Closures Inc., Newmarket (CA)

( * ) Notice: Subject to any disclaimer, the term of this patent is extended or adjusted under 35 U.S.C. 154(b) by 383 days.

(21) Appl. No.: 12/599,162

(22) PCT Filed: May 9, 2008

(86) PCT No.: PCT/CA2008/000892
§ 371 (c)(1),
(2), (4) Date: Nov. 6, 2009

(87) PCT Pub. No.: WO2008/138122
PCT Pub. Date: Nov. 20, 2008

(65) Prior Publication Data
US 2011/0010999 A1 Jan. 20, 2011

Related U.S. Application Data

(60) Provisional application No. 60/916,860, filed on May 9, 2007, provisional application No. 60/968,364, filed on Aug. 28, 2007.

(51) Int. Cl.
*E05F 11/48* (2006.01)
(52) U.S. Cl.
USPC .............. 49/352; 254/278; 254/390; 254/393
(58) Field of Classification Search
USPC ..................................... 49/352; 254/390, 416
See application file for complete search history.

(56) References Cited

U.S. PATENT DOCUMENTS

| RE4,971 E | * | 7/1872 | Weston ......................... 254/393 |
| 3,793,764 A | | 2/1974 | Gagnon, Sr. |

(Continued)

FOREIGN PATENT DOCUMENTS

| DE | 19734529 A1 | 7/1999 |
| DE | 202005017112 U1 | 4/2007 |

(Continued)

OTHER PUBLICATIONS

The American Heritage Dictionary of the English Language, Updated in 2009, Houghton Mifflin Company, Fourth Edition. (Note, this citation is also referenced on p. 8 the Office Action for defining the term engage.).*

(Continued)

*Primary Examiner* — Katherine Mitchell
*Assistant Examiner* — Marcus Menezes
(74) *Attorney, Agent, or Firm* — Millman IP INc.

(57) ABSTRACT

In an aspect, the invention is directed to a combination of a carrier and a pulley assembly. The pulley assembly includes a pulley having an associated pulley rotation axis, a pulley bearing member and a pulley fastener. The pulley fastener connects the pulley assembly to the carrier. The pulley bearing member includes a pulley assembly bending load bearing surface. The carrier is mountable to a vehicle and includes a pulley fastener mount for receiving the pulley fastener. The carrier further includes a carrier bending load bearing surface that engages the pulley bending load bearing surface. The pulley assembly bending load bearing surface is generally conical about the pulley rotation axis and tapers outwardly in a direction axially towards the pulley. The carrier bending load bearing surface is generally inner-conical about the pulley rotation axis.

4 Claims, 37 Drawing Sheets

(56) References Cited

U.S. PATENT DOCUMENTS

| | | | |
|---|---|---|---|
| 4,790,799 A | | 12/1988 | Sadler |
| 4,988,231 A | * | 1/1991 | Pettit ............................ 403/370 |
| 5,058,322 A | * | 10/1991 | Sambor ........................... 49/352 |
| 5,333,411 A | * | 8/1994 | Tschirschwitz et al. ........ 49/352 |
| 5,704,124 A | * | 1/1998 | Trauzettel .................. 29/898.04 |
| 5,720,681 A | | 2/1998 | Benson |
| 6,095,937 A | * | 8/2000 | Aaen ............................... 474/10 |
| 6,282,839 B1 | * | 9/2001 | Fischer et al. ................... 49/352 |
| 6,571,515 B1 | * | 6/2003 | Samways et al. ............... 49/502 |
| 6,607,339 B1 | * | 8/2003 | Mangapora ................... 411/107 |
| 2003/0009948 A1 | | 1/2003 | Nishikawa et al. |
| 2003/0013566 A1 | | 1/2003 | Vorndran et al. |
| 2003/0166426 A1 | | 9/2003 | Anderson |
| 2004/0139658 A1 | | 7/2004 | Marshall |
| 2004/0163320 A1 | | 8/2004 | Kirejczyk |
| 2004/0237410 A1 | * | 12/2004 | Cardine et al. .................. 49/352 |
| 2007/0117663 A1 | | 5/2007 | Van Der Leest |
| 2007/0199246 A1 | | 8/2007 | Renke et al. |
| 2008/0034567 A1 | * | 2/2008 | Galbreath et al. .............. 29/428 |

FOREIGN PATENT DOCUMENTS

| | | |
|---|---|---|
| FR | 2880293 A1 | 7/2006 |
| JP | 200170885 | 6/2000 |
| JP | 2001132321 A | 5/2001 |
| KR | 20040006604 | 1/2004 |

OTHER PUBLICATIONS

EP087482931.5 - Search Report - Aug. 17, 2012.

EP087482931.5 - Europeon Office Action - Apr. 8, 2013.

* cited by examiner

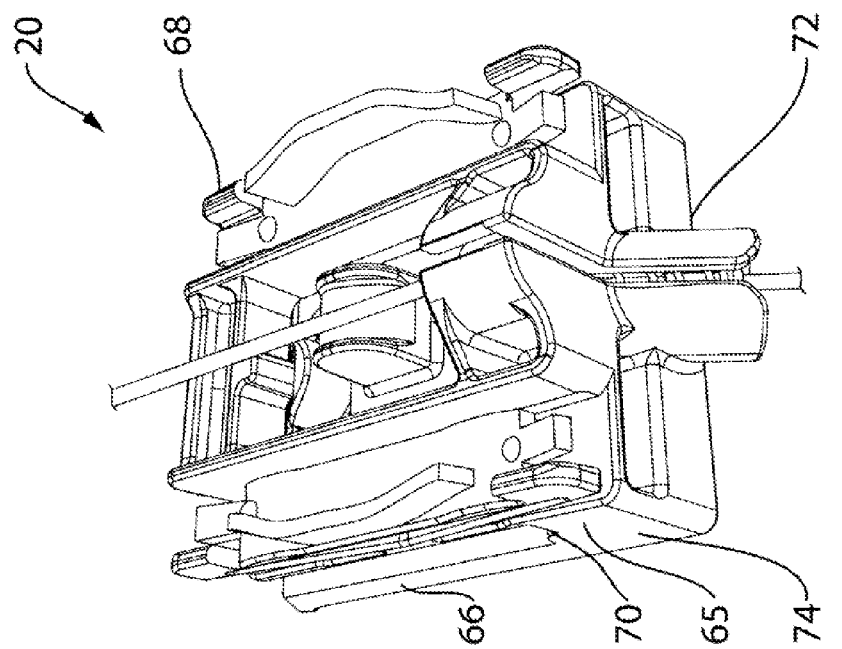
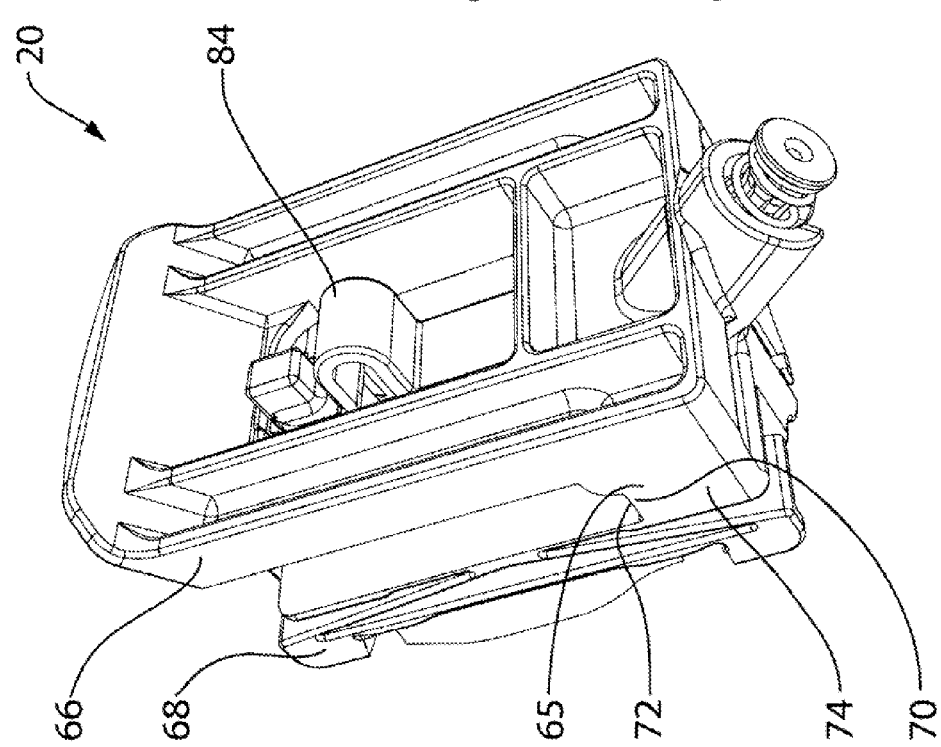

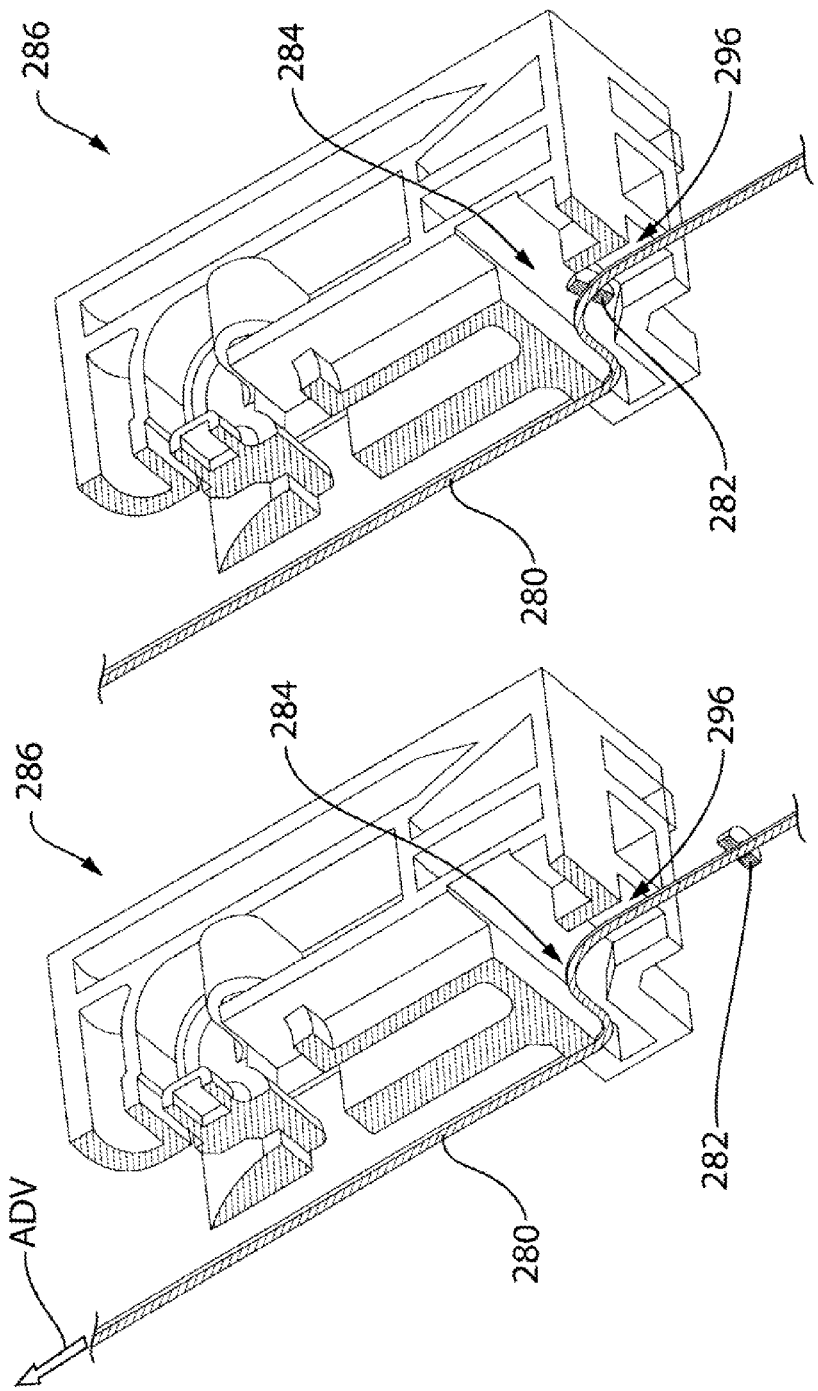

WINDOW REGULATOR ASSEMBLY FOR A VEHICLE

CROSS-REFERENCE TO RELATED APPLICATIONS

This application is a national phase entry filed under 35 U.S.C. section 371, of PCT application no. PCT/CA08/000,892 filed May 9, 2008, which claims priority to U.S. Provisional No. 60/916,860 filed May 9, 2007 and U.S. Provisional No. 60/968,364 filed Aug. 28, 2007.

FIELD OF THE INVENTION

The present invention relates to window regulator assemblies for vehicles.

BACKGROUND OF THE INVENTION

Vehicle doors typically have windows that can be opened and closed. Within the door, there is typically a window regulator assembly including a carrier, a motor, first and second rails and two window regulator lifter plate assemblies which are driven along the rails by the motor.

There are several problems, however, with these window regulator assemblies. For example, in situations where the window regulator lifter plate assemblies are driven by cables connected to the motor, there are pulleys that are used to effect a change in direction for the cables. Due to the forces involved in moving the window, however, the joint between the pulleys and the carrier may be subject to premature failure.

Another problem resides in the configuration of the lifter plate assemblies themselves. Typically, the lifter plate assembly receives the window and locks the window in place to prevent unintentional withdrawal of the window from the lifter plate assembly during use. However, the force required to insert a window into the lifter plate assembly is relatively high.

Another problem is that the window regulator lifter plate assemblies are prone to binding or sticking as they move along the rails. To overcome this, vehicle manufacturers have resorted to relatively large motors to drive the window regulator lifter plate assemblies. However, the large motors increase the overall cost of the window regulator assemblies.

Another problem is that, when a door handle assembly is mounted to the carrier, the door handle itself can swing during transport or during installation of the carrier in a door assembly, which can cause the door handle to catch on something, potentially causing damage.

In general it is advantageous to reduce the cost of any assembly that is incorporated into a vehicle.

SUMMARY OF THE INVENTION

In a first aspect, the invention is directed to a combination of a carrier and a pulley assembly. The pulley assembly includes a pulley and a pulley bearing member that has a pulley bending load bearing surface that is conical and that mates with a carrier bending load bearing surface that is inner-conical.

In a particular embodiment of the first aspect, the pulley assembly includes a pulley having an associated pulley rotation axis, a pulley bearing member and a pulley fastener. The pulley fastener connects the pulley assembly to the carrier. The pulley bearing member includes a pulley assembly bending load bearing surface. The carrier is mountable to a vehicle. The carrier includes a pulley fastener mount for receiving the pulley fastener. The carrier further includes a carrier bending load bearing surface that engages the pulley bending load bearing surface. The pulley assembly bending load bearing surface is generally conical about the pulley rotation axis. The carrier bending load bearing surface is generally inner-conical about the pulley rotation axis.

In a second aspect, the lifter plate invention is directed to a lifter plate that is capable of a relatively strong connection to a vehicle window. The lifter plate includes a lifter plate body including a first side wall and a second side wall configured to receive a vehicle window therebetween, a window holding member positionable in a locking position to prevent the withdrawal of the vehicle window from between the first and second side walls, and a locking member positioned to prevent the movement of the window holding member out of the locking position in the event of a force urging the withdrawal of the vehicle window from between first and second side walls.

In a particular embodiment of the second aspect, the lifter plate includes a first side wall, a second side wall, and a window pass-through member. The first and second side walls are connected together proximate their respective bottoms, and are configured to receive a vehicle window therebetween. The window pass-through member is configured to pass-through a locking aperture of a vehicle window. The window pass-through member has a connected end and a free end. The connected end is connected to the first side wall. The second side wall includes a free end vertical limit surface that is positioned to engage the free end to limit upward movement of the free end. A feature on the window pass-through member prevents rotation away from the vertical limit surface when a force is applied to remove the lifter plate from the window.

In another embodiment of the second aspect, the lifter plate includes a first side wall, a second side wall, and a window pass-through member. The first and second side walls are connected together proximate their respective bottoms, and are configured to receive a vehicle window there between. The window pass-through member is configured to pass-through a locking aperture of a vehicle window. The window pass-through member is permitted to pivot such that as the window is inserted into the lifter plate, the window pass-through member is rotated into a locking position within the lifter plate. In the locking position, the window pass-through member is supported against upward vertical movement and therefore prevents removal of the window from the lifter plate. The window pass-through member can be unlocked from the lifter plate for service requirements.

In a third aspect, the lifter plate invention is directed to a vehicle window lifter plate that has a reduced tendency to bind when in use. The lifter plate has lateral engagement surfaces that are for engagement with lateral guide surfaces and has cable mounts for receiving drive cables. The cable mounts are positioned laterally between the lateral engagement surfaces.

In a particular embodiment of the third aspect, the lifter plate has a lifter plate body having a longitudinal axis and having a first lateral guide surface engager and a second lateral guide surface engager. The first and second lateral guide surface engagers are parallel and laterally spaced from each other, and are configured to engage first and second lateral guide surfaces for guiding movement of the lifter plate in a longitudinal direction. The lifter plate body includes a first cable mount and a second cable mount. The first and second cable mounts are positioned laterally between the first and second lateral guide surface engagers.

In a fourth aspect, the lifter plate invention is directed to a vehicle window lifter plate. The vehicle window lifter plate has lateral engagement surfaces that are for engagement with lateral guide surfaces. The lateral engagement surfaces are biased against the lateral guide surfaces, thereby giving the lifter plate the capability to accommodate lateral forces with a reduced tendency to bind.

In a particular embodiment of the fourth aspect, the lifter plate is for movement of a vehicle window along a first lateral guide surface and a second lateral guide surface. The first and second lateral guide surfaces are generally parallel and laterally spaced from each other and face in opposite directions. The lifter plate includes a lifter plate body, a first lateral guide surface engager and a first lateral guide surface engager biasing member. The lifter plate body has a longitudinal axis. The first and second lateral guide surface engagers are connected to the lifter plate body. The first and second lateral guide surface engagers are parallel and laterally spaced from each other. The first lateral guide surface engager biasing member is positioned to bias the first lateral guide surface engager towards the first lateral guide surface.

In a fifth aspect, the invention is directed to carrier for a window regulator assembly. The carrier includes at least one integral rail that is for guiding the movement of a window lifter plate.

In a particular embodiment of the fifth aspect, the carrier includes a carrier body and at least one rail. The carrier body is configured for mounting to a vehicle door. The at least one rail guides the movement of a lifter plate assembly, and is integral with the carrier body.

In a sixth aspect, the invention is directed to a carrier for use in a vehicle door assembly for a vehicle, wherein the carrier has a carrier seal that is co-molded with the carrier body.

In a particular embodiment of the sixth aspect, the carrier includes a carrier body that is configured for mounting to a vehicle door, and a carrier seal connected to the carrier body for sealing against a component of the door assembly. The carrier seal is co-molded with the carrier body.

In a seventh aspect, the invention is directed to a wiring harness clip for use in a vehicle. The wiring harness clip has two clip elements that together define a wiring harness retaining aperture in a longitudinal direction and an inlet thereto. The wiring harness inlet is canted to a non-zero angle relative to the longitudinal direction. The perpendicular spacing between the two clip elements is larger than the distance between them in the transverse direction.

In a particular embodiment of the seventh aspect, the wiring harness clip includes a first clip element and a second clip element. The first and second clip elements together define a longitudinal axis, and together define a wiring harness retaining aperture configured to hold a wiring harness along the longitudinal axis. The first clip element has a first clip element inlet defining surface. The second clip element has a second clip element inlet defining surface. The first and second clip element inlet defining surfaces are parallel and extend at a non-zero angle relative to the longitudinal axis. The first and second clip element inlet defining surfaces together define an inlet into the wiring harness retaining aperture. A perpendicular distance between the first and second clip element inlet defining surfaces is larger than a transverse distance between the first and second clip element inlet defining surfaces.

In an eighth aspect, the invention is directed to a carrier for a vehicle door, wherein the carrier has a carrier body and a mount integrally connected with the carrier body for a door handle.

In a ninth aspect, the invention is directed to a tensioner for a window regulator system for a vehicle door assembly. The tensioner is configured to maintain tension in a length of drive cable between a drive motor and a first lifter plate and to maintain tension in a length of drive cable between the drive motor and a second lifter plate.

In a particular embodiment of the ninth aspect, the tensioner includes a tensioner body pivotally connected to a stationary element of the vehicle door assembly. The tensioner body has a first cable engagement member and a second cable engagement member. The first cable engagement member bends a first length of cable between the drive motor and the first lifter plate. The second cable engagement member bends a second length of cable between the drive motor and the second lifter plate. In a preferred embodiment, the tensioner equalizes the tension in the first and second lengths of cable.

In the tenth aspect, the invention is directed to a window regulator system for a vehicle door assembly, wherein a down stop system is provided by engagement of a down stop on a carrier with a down stop engagement member on a drive cable.

In a particular embodiment of the ninth aspect, the window regulator system includes a drive motor, a first lifter plate and a second lifter plate, a carrier for holding the drive motor, the first and second lifter plates, a set of drive cables connecting the drive motor and the first and second lifter plates, a down stop that is connected to the carrier, and a down stop engagement member that is connected to one of the drive cables. The down stop engagement member is positioned to engage the down stop and prevent further travel of the drive cable when the first and second lifter plates reach a selected position.

In an eleventh aspect, the invention is directed to a lifter plate that is capable of a relatively strong connection to a vehicle window. The lifter plate has a window holding member that locks against an edge feature such as an undercut on the window to prevent withdrawal of the window from the lifter plate.

In a particular embodiment of the eleventh aspect, the lifter plate includes a first side wall, a second side wall and two window locking features. The first and second side walls are connected together proximate their respective bottoms and sides, and are configured to receive a vehicle window therebetween. The window has an undercut on its two side edges. The window locking features are configured to engage the undercuts of the window when the window is inserted into the lifter plate. Side members on the lifter plate prevent the locking features from moving generally perpendicularly to the extraction direction of the window from the lifter plate. The locking features may be mounted to the lifter plate with flexible members that permit the locking feature to flex generally perpendicularly to the glass surface and allow for insertion of the window into the lifter plate.

BRIEF DESCRIPTION OF THE DRAWINGS

The present invention will now be described by way of example only with reference to the attached drawings, in which:

FIGS. 9a and 9b are magnified perspective views of a lifter plate that is part of the window regulator assembly shown in FIG. 1;

FIG. 35 is another magnified sectional perspective view of the lifter plate shown in FIG. 33, illustration a first stage of installation of a cable into the lifter plate;

FIG. 36 is another magnified sectional perspective view of the lifter plate shown in FIG. 33, illustration a second stage of installation of the cable into the lifter plate;

DETAILED DESCRIPTION OF THE INVENTION

Figure 1:
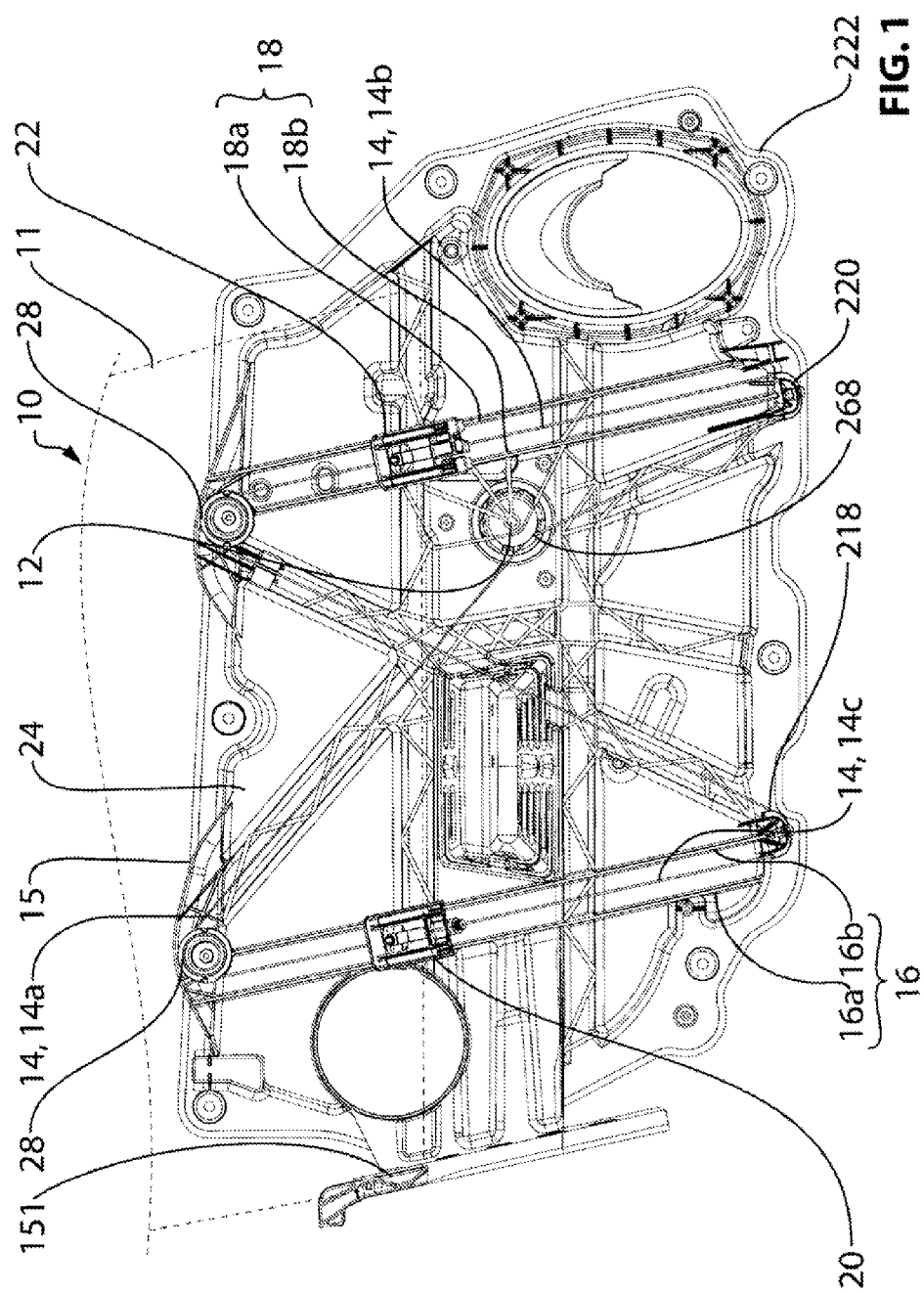
FIG. 1 is a perspective view of a window regulator assembly in accordance with an embodiment of the present invention.

Reference is made to FIG. 1, which shows a window regulator assembly 10 for moving a vehicle window 11 up and down in accordance with an embodiment of the present invention. The window regulator assembly 10 includes a drive motor 12, a set of drive cables 14, including a first drive cable 14a, a second drive cable 14b and a third drive cable 14c, a carrier 15, which includes a first set of rails 16 and second set of rails 18, a first lifter plate 20 and a second lifter plate 22.

The drive motor 12 drives vertical movement of the first and second lifter plates 20 and 22 on the set of rails 16 and 18 respectively by means of the drive cables 14.

The carrier 15 is itself mountable to the interior of a door assembly (not shown) that forms part of a vehicle. In the embodiment shown in FIG. 1, the carrier 15 is a structural element, and is configured to withstand loads incurred during operation of window regulator assembly 10. The carrier 15 includes a carrier body 24 and the aforementioned first and second set of rails 16 and 18. The first set of rails 16 may include a first rail 16a and a second rail 16b. The first rail 16a is integrally mounted to the carrier body 24. The first rail 16a is an elongate rectangular structure. The second rail 16b may be similar to the first rail 16a, and may be an elongate rectangular structure that is integral with the carrier body 24. The first and second rails 16a and 16b may be parallel to each other. As shown in FIG. 1, the first and second rails 16a and 16b may each generally extend in a plane that is generally perpendicular to the surface of the carrier body 24.

Figure 2:
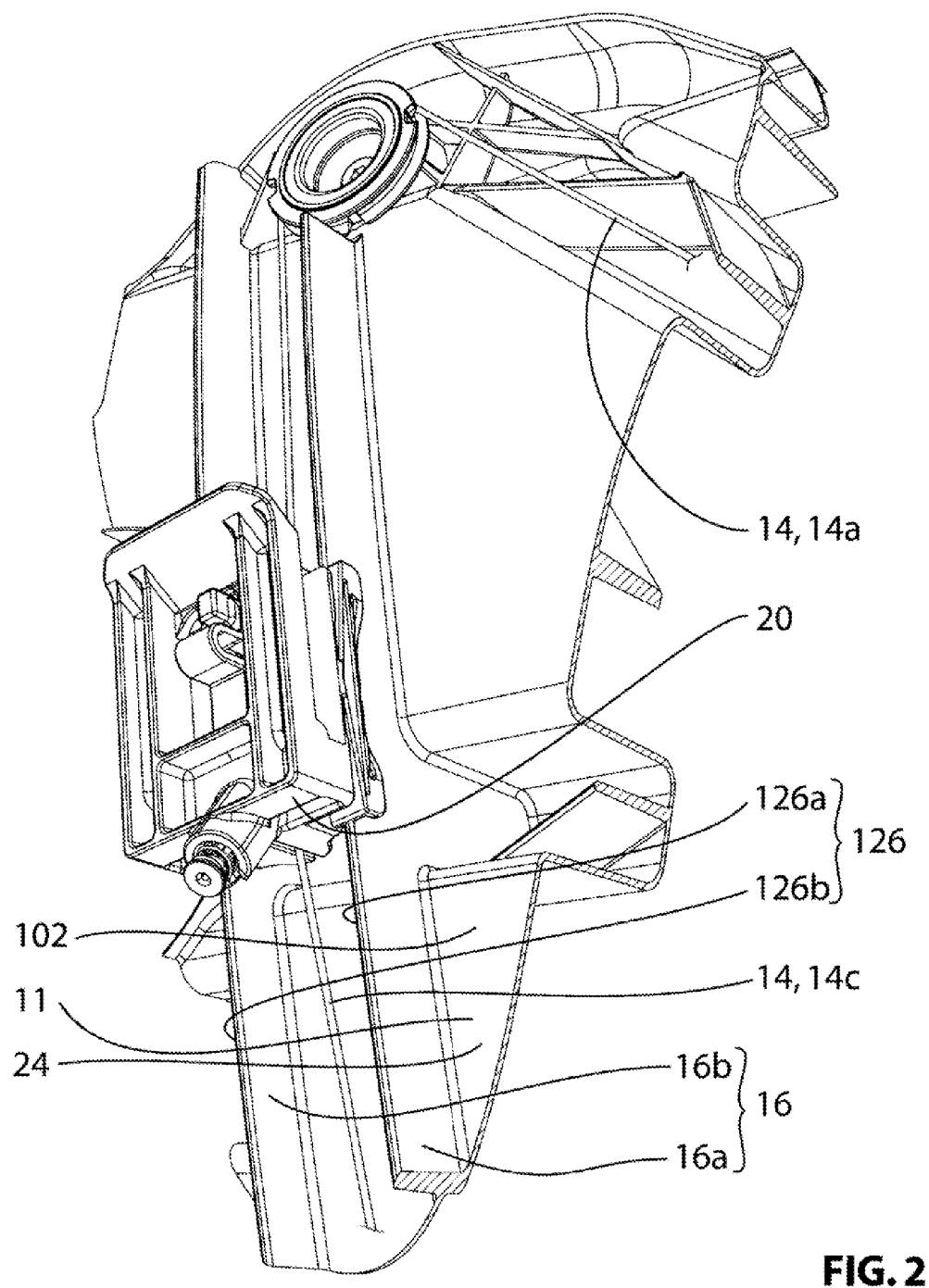
FIG. 2 is a magnified perspective view of a portion of the window regulator assembly shown in FIG. 1.

It has been shown in FIGS. 1 and 2 for the first set of rails 16 to include two rails (ie. rails 16a and 16b). It is alternatively possible for the first set of rails to include as little as a single rail (eg. rail 16a), or a greater number of rails, such as three rails.

The second set of rails 18 may be similar in quantity and in structure to the first set of rails 16. By configuring the first and second sets of rails 16 and 18 to extend generally perpendicularly to the surface of the carrier body 24, the carrier 15 may be more easily manufactured by a molding process, such as an injection molding process.

Figure 3:
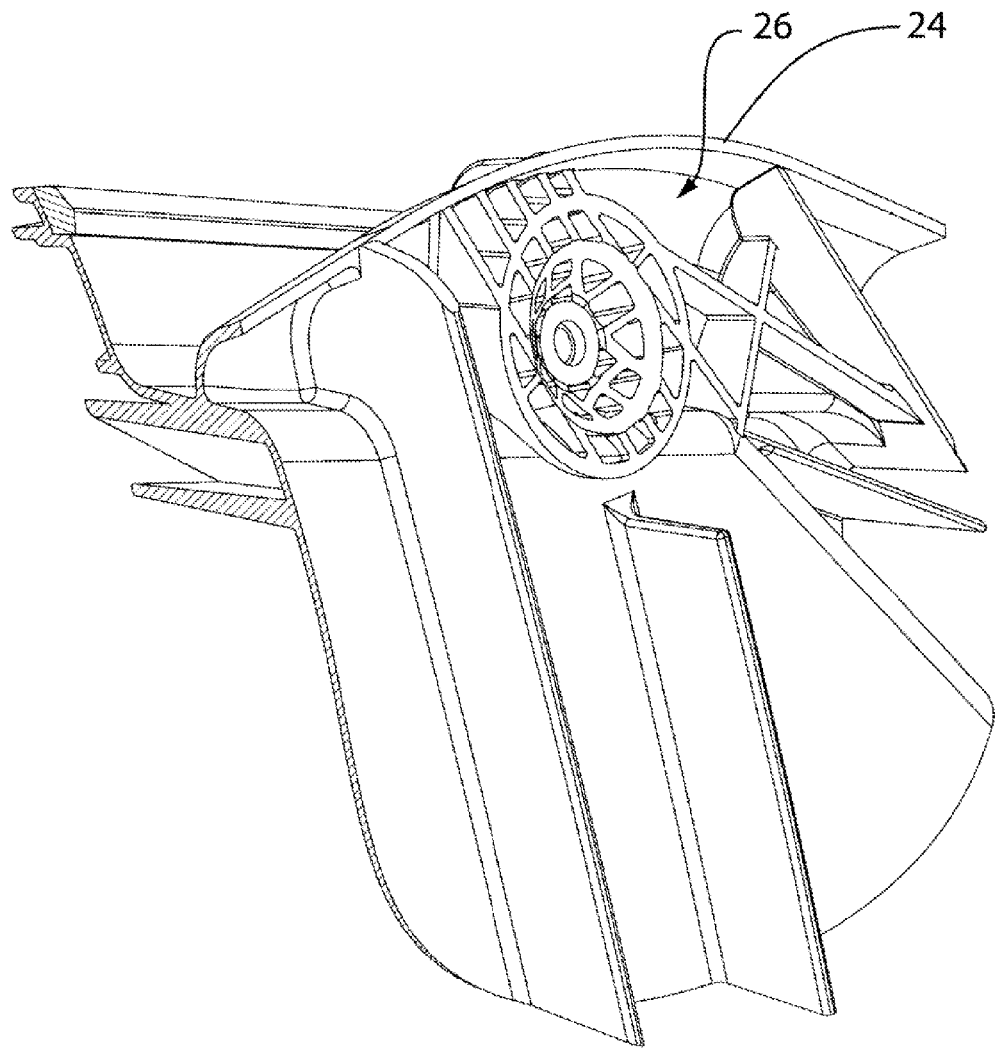
FIG. 3 is a magnified perspective view of a portion of a carrier and is part of the window regulator assembly shown in FIG. 1.

Reference is made to FIG. 3, which shows a pulley assembly mount 26 that is part of the carrier body 24. The pulley assembly mount 26 is configured to receive a pulley assembly 28 (FIG. 4), that is used to effect a change in direction in one of the drive cables 14 (see FIG. 6).

Figure 4:
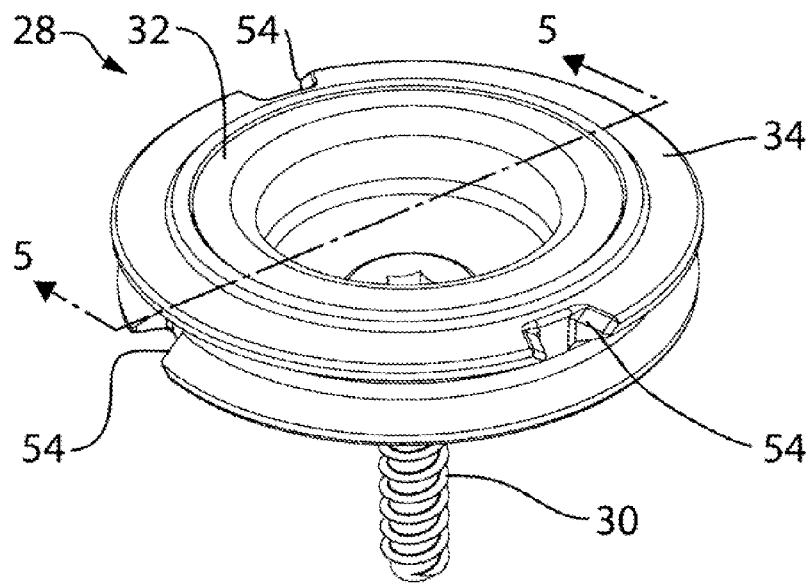
FIG. 4 is a magnified perspective view of a pulley assembly that is part of the window regulator shown in FIG. 1.
Figure 5:
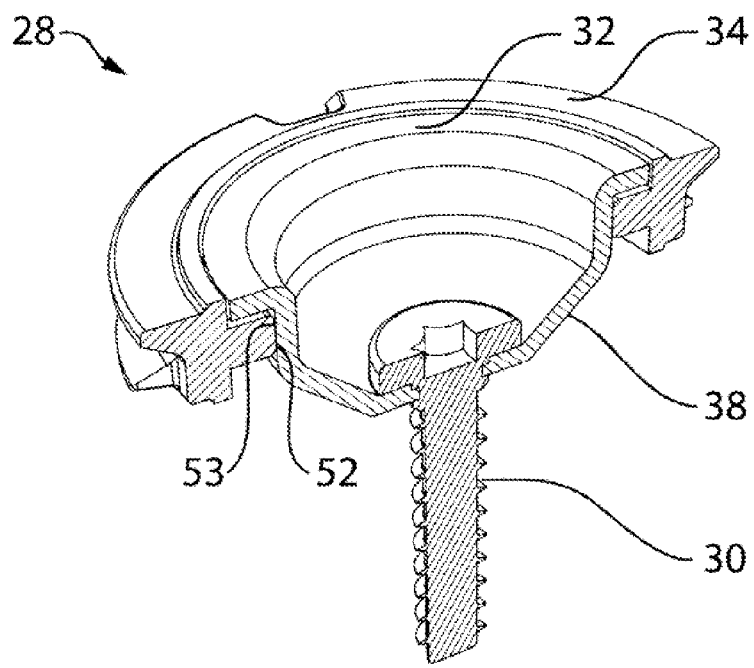
FIG. 5 is a magnified sectional perspective view of the pulley assembly shown in FIG. 4.

Referring to FIG. 4, the pulley assembly 28 includes a pulley fastener 30, a pulley bearing member 32, and a pulley 34.

Figure 6:
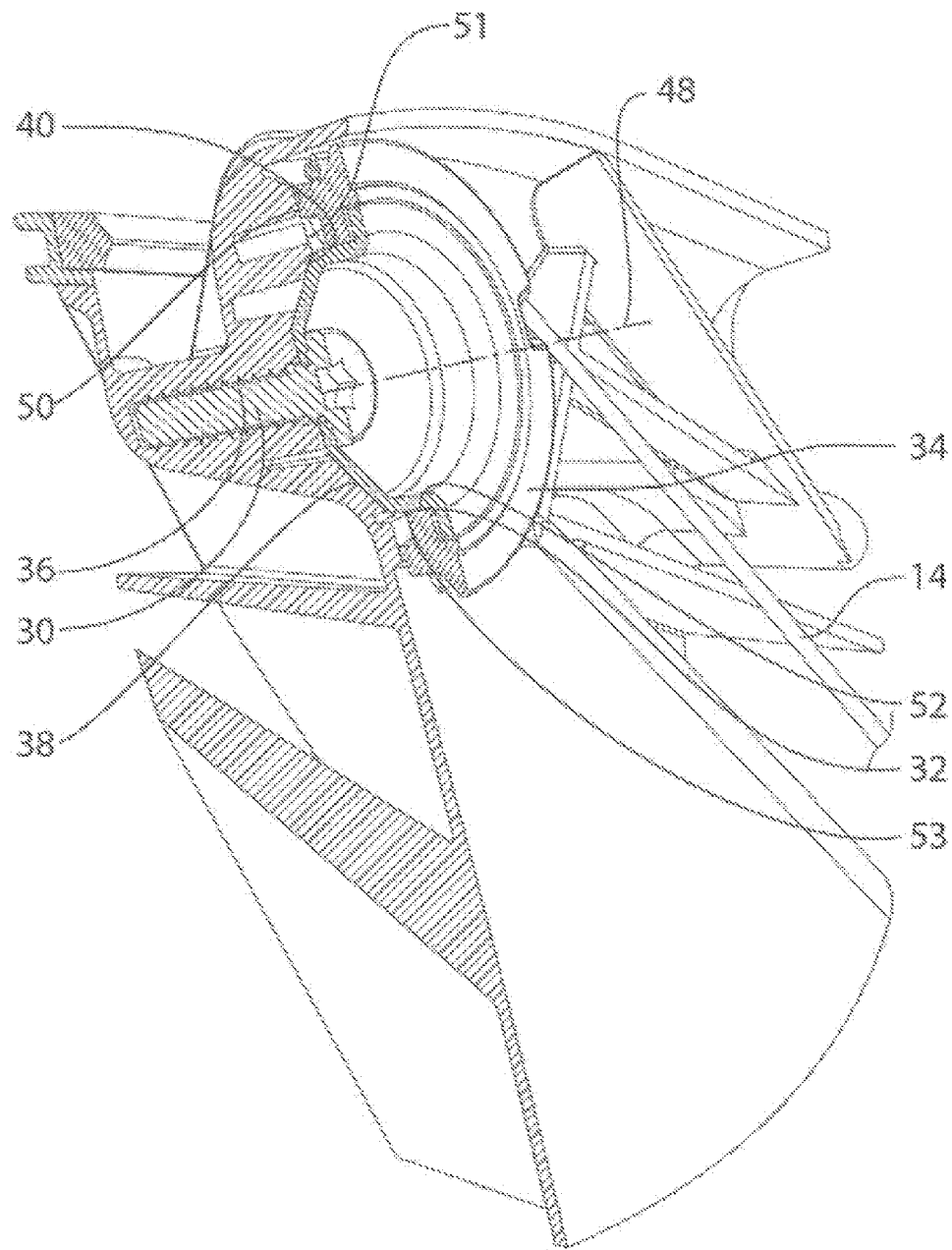
FIG. 6 is a magnified sectional perspective view of the pulley assembly shown in FIG. 4 mounted to the portion of the carrier shown in FIG. 3.

Referring to FIG. 6, the pulley fastener 30 cooperates with a pulley fastener mount 36 on the carrier body 24 to hold the pulley assembly 28 on the carrier 16. The pulley fastener 30 may be any suitable type of fastener such as, for example, a threaded fastener.

Figure 45:
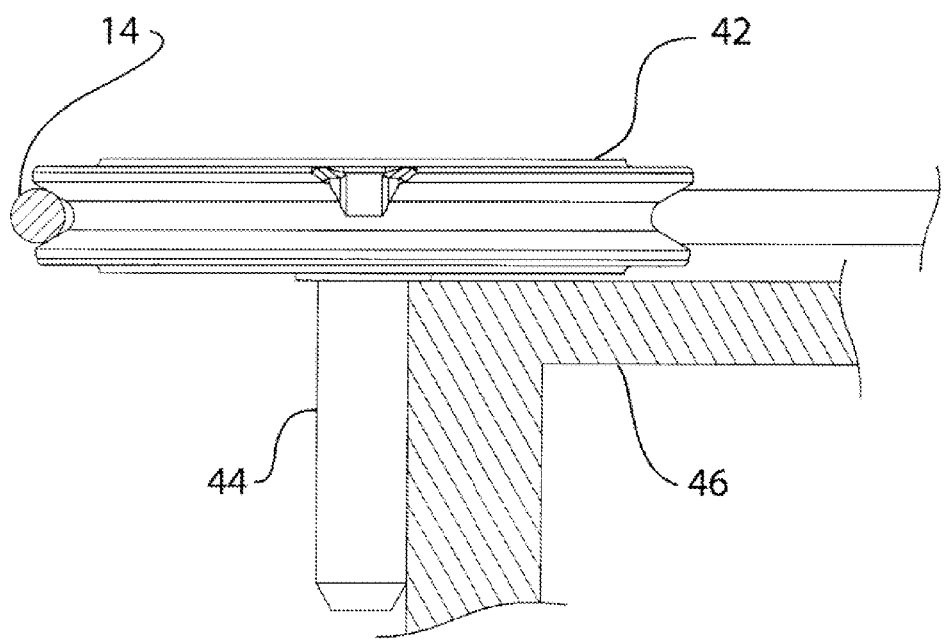
FIG. 45 is a sectional side view of a prior art pulley and carrier, illustration the transmission of force therebetween.

The pulley bearing member 32 is retained by the pulley fastener 30 in engagement with the carrier body 24. The pulley bearing member 32 includes a pulley assembly bending load bearing surface 38 which may be a generally conical surface. The pulley assembly bending load bearing surface 38 mates with a carrier bending load bearing surface 40 that is part of the pulley assembly mount 26. By providing coned bending load bearing surfaces 38 and 40 on the pulley bearing member 32 and in the pulley assembly mount 26, the loads incurred during operation of the window regulator assembly 10 are spread over a larger surface area than occurs in some prior art devices. For example, in some prior art pulleys, the bending load exerted by a drive cable on a pulley passes through the pulley, and in turn from the pulley to the corner between the pulley fastener and the pulley fastener aperture in the carrier, as illustrated by the prior art pulley 42 and the prior art pulley fastener 44 and the carrier 46 in FIG. 45. The cone angle between the pulley assembly bending load bearing surface 38 and the axis about which the pulley rotates, which is the pulley rotation axis 48 shown in FIG. 6, may be any suitable angle such as, for example, approximately 45 degrees. Similarly, the cone angle of the carrier bending load bearing surface 40 would be approximately the same angle as that of the pulley assembly bending load bearing surface 38.

The pulley 34 includes a pulley thrust bearing surface 50 that engages a carrier thrust bearing surface 51 during rotation of the pulley 34. In order to reduce the frictional drag between the pulley thrust bearing surface 50 and the carrier thrust bearing surface 51, the pulley thrust bearing surface 50 may have a relatively small radial width. This is possible in situations where thrust loads are not expected to be substantial.

The interface between the rotating portion of the pulley assembly 28 and the fixed portion occurs at the pulley rotational bearing surface, shown at 52, and the pulley bearing member rotational bearing surface, shown at 53. It will be noted that the aforementioned interface is moved relatively far out radially from the center of rotation of the pulley 34. This reduces, among other things, the moment that is applied from the pulley to the pulley bearing member 32 and to the pulley fastener 30, in the plane of rotation of the pulley 34, during operation of the window regulator assembly 10 (FIG. 1).

Referring to FIG. 4, the pulley 34 includes notches 54 that can be used when partially mounting a cable 14, as part of a technique for installing a cable onto the pulley 34.

The pulley fastener 30 and the pulley bearing member 32 may be manufactured from any suitable materials, such as a suitable steel. It will be understood that it is optionally possible for the pulley fastener 30 and the pulley bearing member 32 to be manufactured as a single integral component.

The pulley 34 may be manufactured from any suitable material, such as, for example, a polymeric material, such as Delrin™.

Figure 7:
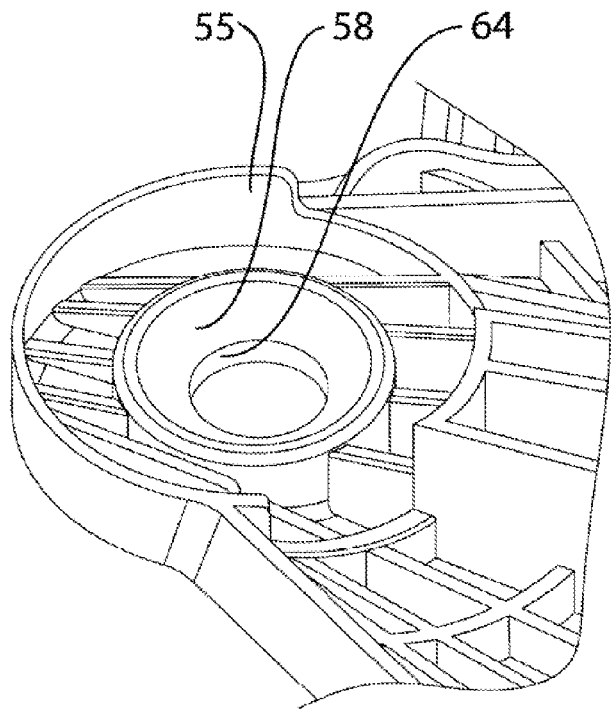
FIG. 7 is a magnified perspective view of an alternative structure for the portion of the carrier shown in FIG. 3.
Figure 8:
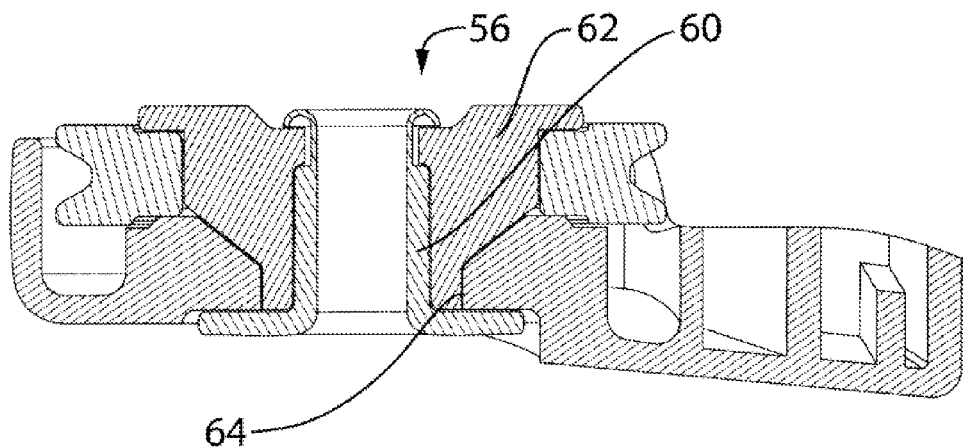
FIG. 8 is a magnified sectional side view of an alternative pulley assembly mounted to the alternative carrier structure shown in FIG. 7.

Reference is made to FIGS. 7 and 8, which shows a pulley assembly mount 55 and a pulley assembly 56 in accordance with another embodiment of the present invention. The pulley assembly mount 55 may be similar to the pulley assembly mount 26 (FIG. 3), with one difference being that the pulley assembly mount 55 has a carrier bending load bearing surface 58 that is a solid surface, instead of the carrier bending load bending surface 40 shown in FIG. 6, which is formed from a matrix of structural ribs.

Referring to FIG. 8, the pulley assembly 56 differs principally from the pulley assembly 28 (FIG. 6), in that the pulley fastener 60 shown in FIG. 8 is not a threaded fastener, and instead pushes in to retain the pulley bearing member 62 from the other side of a passed through aperture shown at 64.

Reference is made to FIGS. 9a and 9b, which show the lifter plate 20. The lifter plate 20 includes a lifter plate body 65 with a first side wall 66 and a second side wall 68. The first and second side walls 66 and 68 are configured to receive the vehicle window 11 therebetween (see FIG. 14). As further shown in FIG. 14, the lifter plate 20 includes a window holding member 76 for holding the window 11 in position in the lifter plate 20 thereby preventing the inadvertent withdrawal of the vehicle window 11 from the lifter plate 20. The window holding member 76 may pass through a locking aperture 78 in the vehicle window 11 and may thus be referred to in such embodiments as a window pass-through member 76. The window pass-through member 76 has an attached end 80 where it is connected to the first side wall 66 and a free end 82. At the attached end 80, the window pass-through member 76 is connected to a biasing member 84 which in turn is connected to the first side wall 66. The window pass-through member 76 further includes a deflection surface 86 (see FIG. 15) that is sloped downwardly toward the free end 82. When the vehicle window 11 is introduced between the first and second side walls 66 and 68, the bottom of the vehicle window shown at 88 engages the deflection surface 86 thereby pushing the window pass-through member 76 out of the way temporarily. As the vehicle window 11 is further introduced into the space between the first and second side walls 66 and 68 the window pass-through member 76 is biased by the biasing member 84 to return to its original position, which it can do when the locking aperture 78 passes in front of it. When the window pass-through member 76 returns to its original position through the locking aperture 78 it locks the vehicle window 11 to the lifter plate 20.

Figure 14:
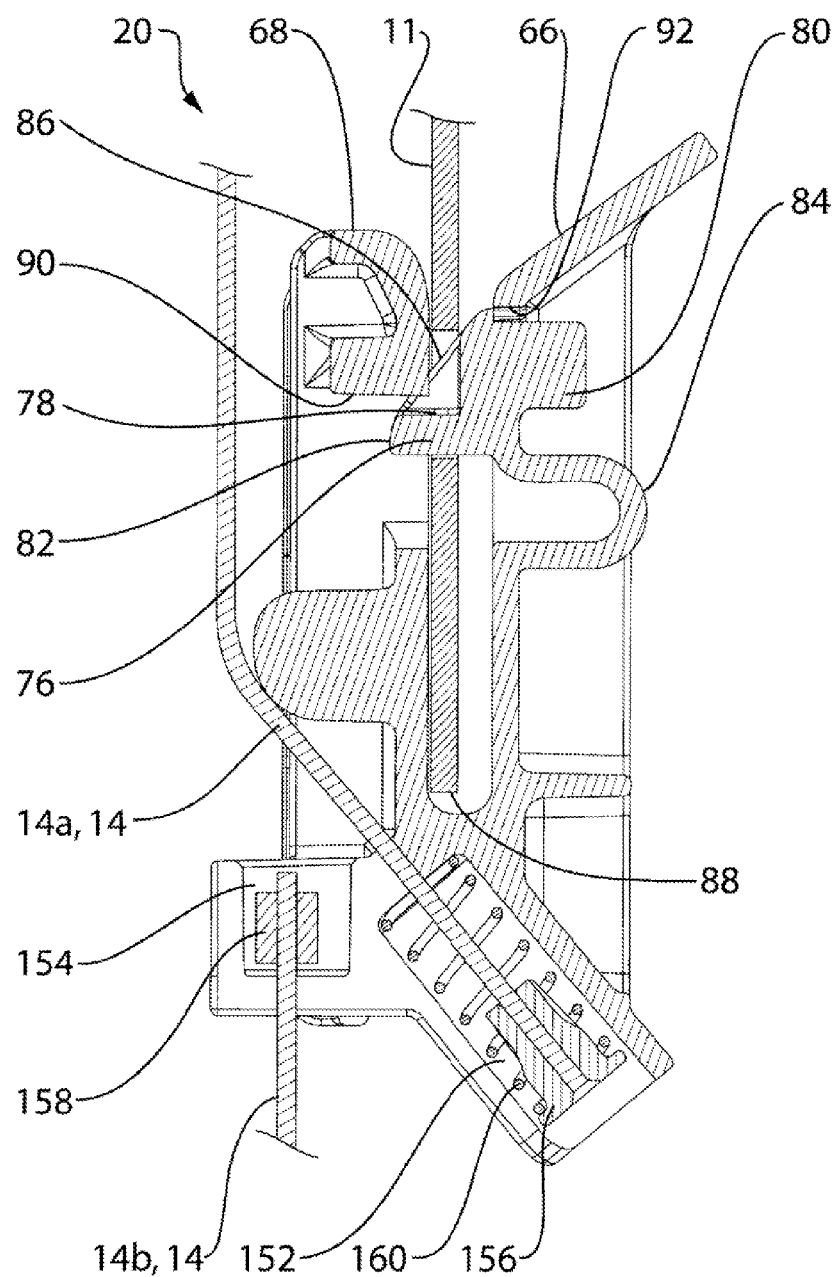
FIG. 14 is a magnified sectional view of the lifter plate shown in FIGS. 9a and 9b, illustrating the engagement of the lifter plate with the vehicle window.
Figure 15:
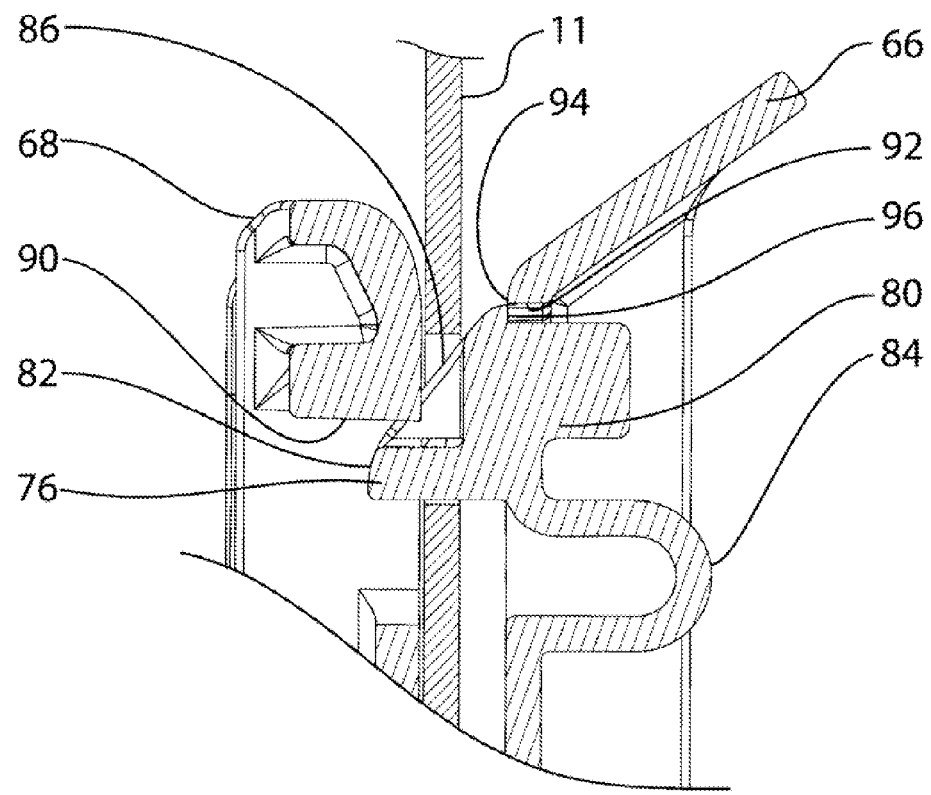
FIG. 15 is a further magnified sectional side view of the lifter plate shown in FIGS. 9a and 9b.

Referring to FIG. 15, the second side wall 68 includes a free end vertical limit surface 90 that is positioned to limit the upward movement of the free end 82 of the window pass-through member 76 in the event that the vehicle window 11 is attempted to be withdrawn vertically from between the first and second side walls 66 and 68. Additionally, the first side wall 66 may optionally include a connected end vertical limit surface 92 that is positioned to limit the vertical movement of the connected end 80 of the window pass-through member 76, in the event that the vehicle window 11 is attempted to be withdrawn vertically from the between the first and second side walls 66 and 68. Providing the free end vertical limit surface 90 reduces the bending moment that would be exerted on the window pass-through member 76 by the vehicle window 11 in the event that the vehicle window 11 is attempted to be withdrawn vertically from between the first and second side walls 66 and 68. Providing the connected end vertical limit surface 92 relieves the biasing member 84 from having to resist vertical movement of the connected end 80 in the event of an attempted withdrawal vertically of the vehicle window 11 from between the first and second side walls 66 and 68. This, in turn, permits the biasing member 84 to be configured to have relatively low resistance to flexion. Reducing the resistance to flexion of the biasing member 84 thereby facilitates insertion of the window bottom 88 (FIG. 14) past the window pass-through member 76, during the initial insertion of the vehicle window 11 between the first and second side walls 66 and 68 into position between the first and second side walls 66 and 68. By contrast, some lifter plates of the prior art rely solely on the resistance of a biasing member to prevent a vehicle window from deflecting a window pass-through member upwards out of the way during an attempted vertical withdrawal of the vehicle window from the lifter plate.

As a further measure of security, a horizontal limit surface 94 may be provided on the first side wall 66 to prevent the inadvertent retraction horizontally of the window pass-through member 76 during a withdrawal vertically of the vehicle window 11 from the lifter plate 20. The horizontal limit surface 94 on the first side wall 66 is positioned to engage a corresponding horizontal limit surface 96 on the window pass-through member 76 in the event that the window pass-through member 76 is pulled upwards from its original position shown in FIGS. 14 and 15, but does not engage the horizontal limit surface 96 on the window pass-through member 76 in the event that the window pass-through member 76 is moved downwards. Thus, during insertion of the vehicle window 11, the window pass-through member 76 can retract, but in the event of upward movement of the vehicle window 11 the window pass-through member 76 is prevented from being retracted horizontally.

Figure 38:
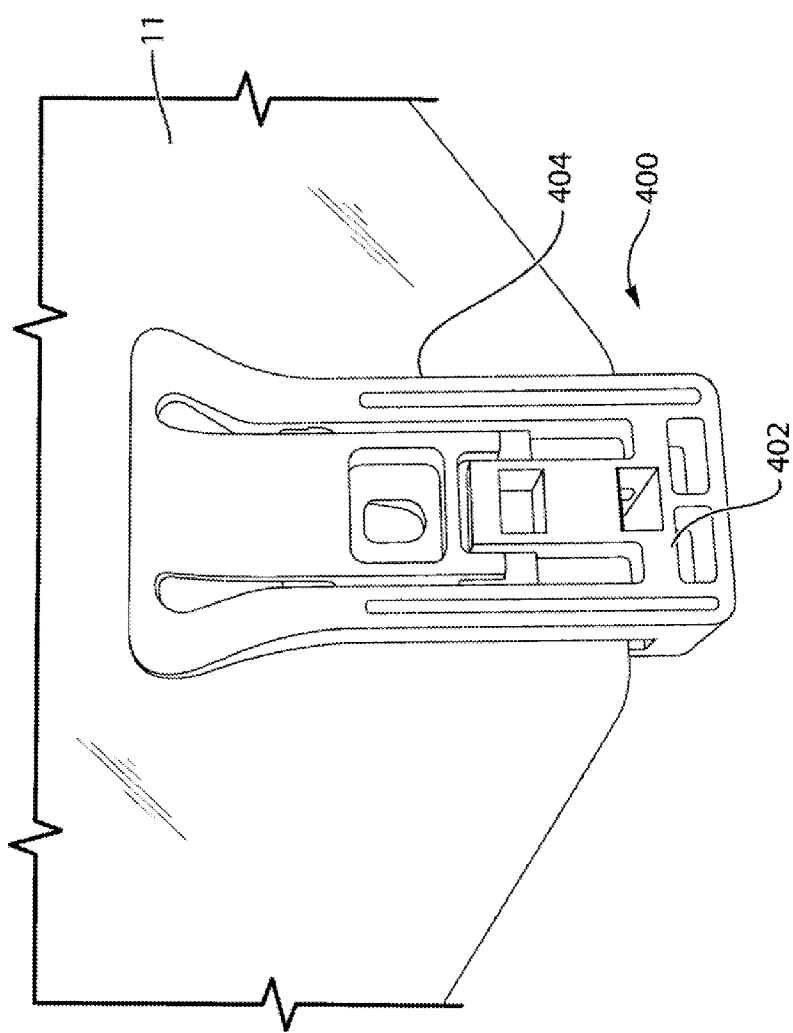
FIG. 38 is a perspective view of a lifter plate in accordance with yet another embodiment of the present invention.

Reference is made to FIG. 38, which shows a lifter plate 400 in accordance with another embodiment of the present invention. The lifter plate 400 includes a different structure for locking the window 11 therein, than the lifter plate 20. The lifter plate 400 includes a lifter plate body 402 having a first side wall 404 and a second side wall 406 (FIG. 39), which are joined at their respective bottoms. A window pass-through member 408 has a connected end 410 and a free end 412 and is configured to pass through the locking aperture 78 of the window 11.

Figure 39:
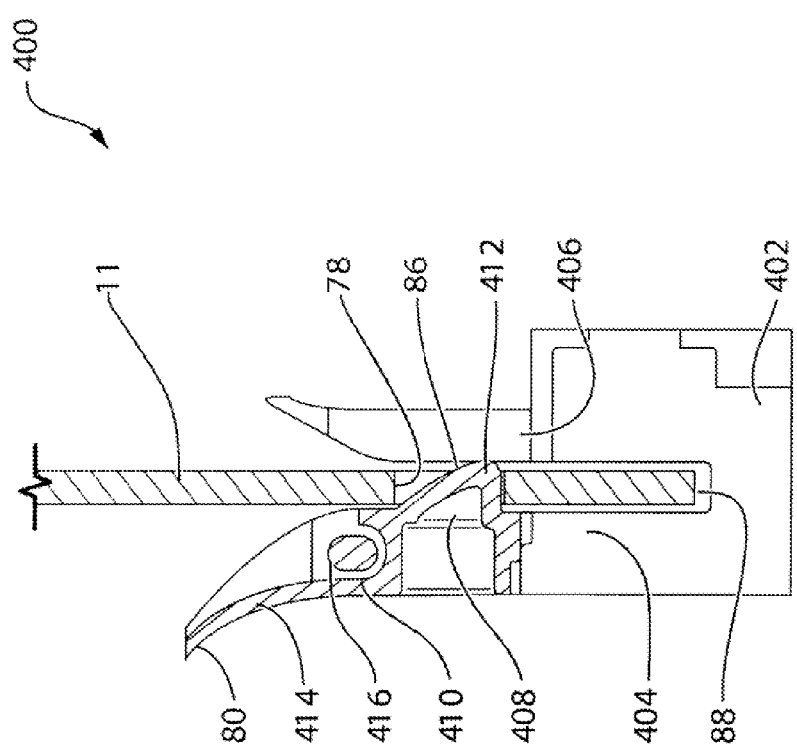
FIG. 39 is a sectional side view of the lifter plate shown in FIG. 38.
Figures 40A, 40B, 40C:
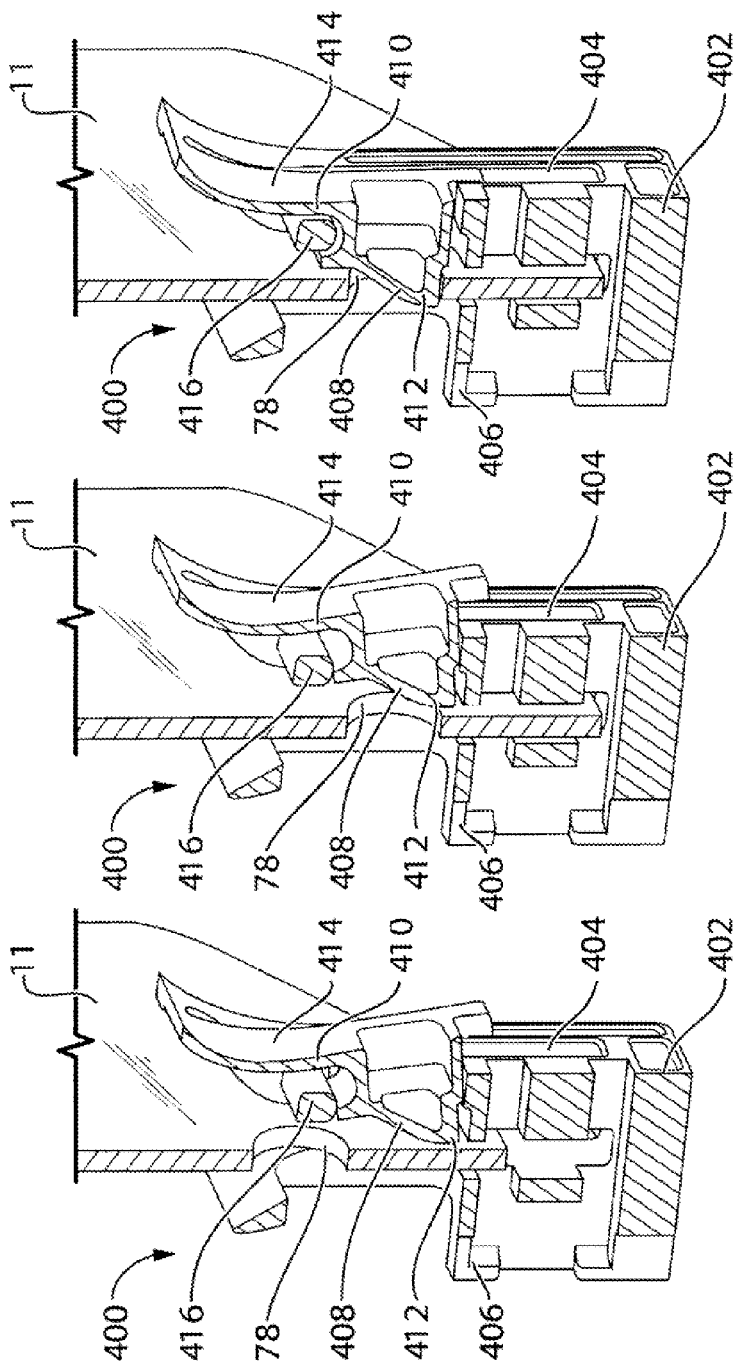
FIGS. 40a, 40b and 40c are sectional perspective views illustrating the insertion of a vehicle window into the lifter plate shown in FIG. 38.

The connected end 410 may be connected to the first side wall 404 by means of a biasing member 414 that biases the window pass-through member 408 towards the locking position shown in FIG. 39. A locking member 416 prevents the window pass-through member 408 from being pushed out of the way by the window 11 if the window 11 is urged to pull out from the lifter plate 400 for some reason. The locking member 416, however, permits the window pass-through member 408 to be pushed out of the way during entry of the window 11 into the lifter plate 400. FIGS. 40a, 40b and 40c illustrate the insertion of the window 11 into the lifter plate 400.

Figure 41:
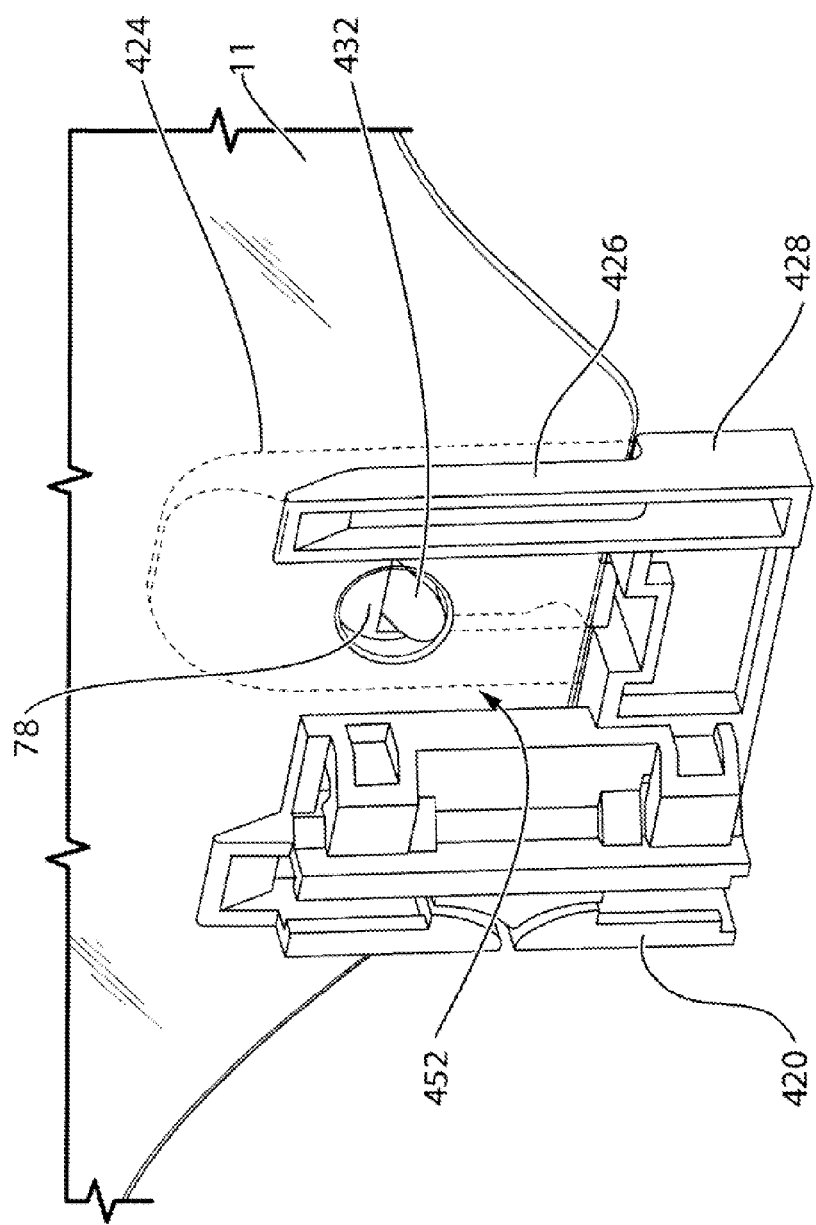
FIG. 41 is a perspective view of a lifter plate in accordance with yet another embodiment of the present invention.
Figure 42:
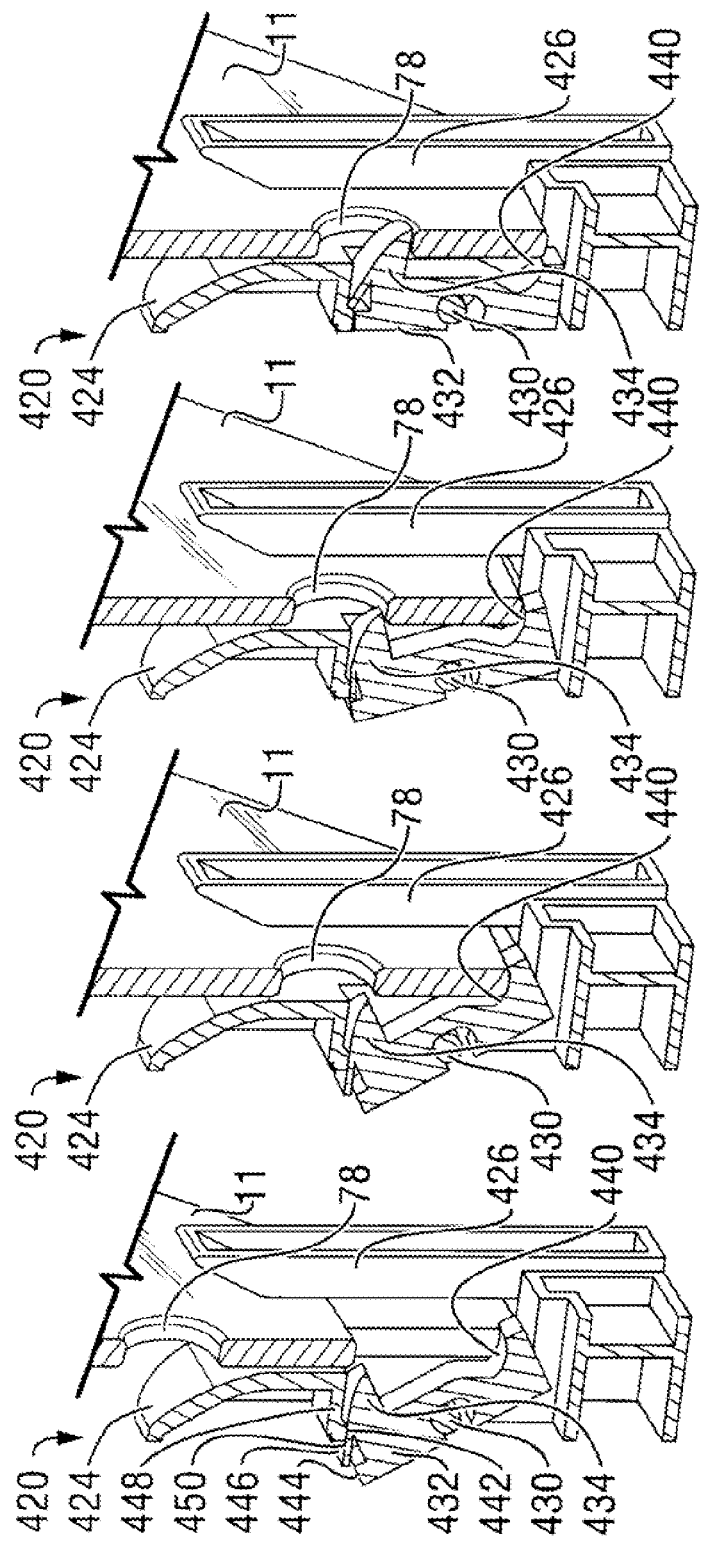
FIGS. 42a, 42b, 42c and 42d are sectional perspective views illustrating the insertion of a vehicle window into the lifter plate shown in FIG. 41.

Reference is made to FIG. 41, which shows a lifter plate 420 in accordance with another embodiment of the present invention. The lifter plate 420 includes a lifter plate body 422 having a first side wall 424 and a second side wall 426 joined at their respective bottoms. The first side wall 424 has an aperture 428 therethrough and a pivot shaft 430 (FIG. 42a) that extends across the aperture 428. A window holding member 432 is a separate member that is removably and pivotably mounted onto the pivot shaft 430.

The window holding member 432 includes a window pass-through member 434 that passes through the locking aperture 78 of the window 11 to lock the window 11 in place in the lifter plate 420. The window holding member 432 further includes a driving surface 440, which is engaged by the window 11 during insertion of the window 11 into the lifter plate 420. When the window 11 engages the driving surface 440 and continues to move downward, the motion of the window 11 causes the window holding member 432 to rotate (clockwise in the view shown in FIGS. 42a-d) from a window-receiving position shown in FIG. 42a towards a window holding position shown in FIG. 42d. The first side wall 424 further includes a vertical limit surface 442 that is positioned to be proximate a vertical limit surface 444 on the window holding member 432 when the window holding member 432 is in the window locking position. In the event that the window 11 is attempted to be withdrawn from the lifter plate 420, the vertical limit surface 442 engages the window holding member 432 to prevent vertical movement thereof. Additionally, the window holding member 432 includes a locking member 446 that engages a locking member 448 on the first side wall 424 to prevent the window holding member 432 from being rotated out of the way by the window 11 during an event wherein the window 11 is attempted to be withdrawn from the lifter plate 420. The locking member 446 may be biased by a resilient arm 450 towards a locking position (FIGS. 42a-d). In the event that the window 11 needs to be withdrawn from the lifter plate 420 for service or maintenance the service person can, using a suitable tool, depress the locking member 446 so that it clears the locking member 448. The service person can lift the window 11 upwards while assisting the rotation of the window holding member 432 out of the way (counter-clockwise in the views shown in FIGS. 42a-d).

A large aperture 452 (FIG. 41) is provided in the second side wall 426 so as to permit the window holding member 432 to be installed on the pivot shaft 430 (FIG. 42a) prior to insertion of the window 11 into the lifter plate 420.

Figure 43:
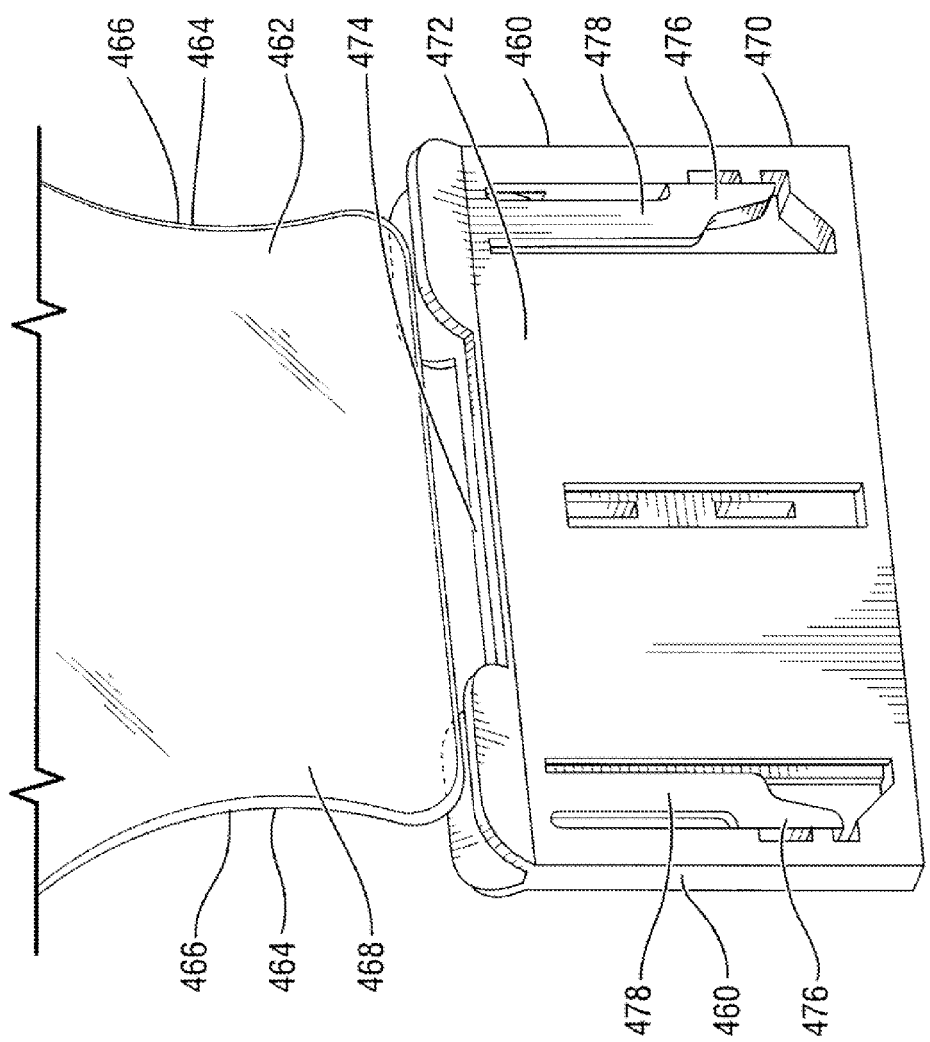
FIG. 43 is a perspective view of a lifter plate in accordance with yet another embodiment of the present invention.

Reference is made to FIG. 43, which shows a lifter plate 460 in accordance with another embodiment of the present invention. The lifter plate 460 is configured to engage a window 462 that does not possess a locking aperture, but instead possesses undercuts 464 along opposing sides 466 of an engagement feature 468.

The lifter plate 460 includes a lifter plate body 470 having a first side wall 472 and a second side wall 474. A pair of window holding members 476 are provided on the first side wall 472 and engage the undercuts 464 to prevent withdrawal of the window 462 once the window 462 has been inserted into position in the lifter plate 460. The window holding members 476 are biased towards a locking position (FIG. 43) by biasing members 478. The biasing members 478 may be pushed outwards from the plane of the first side wall 472 against the urging of the biasing members 478 by the window 462 as it slides therepast. Once the window 462 is in position, the biasing members 478 urge the window holding members 476 back to their locking positions so that they are positioned to engage the undercuts 464 (FIG. 44).

Once in position in the lifter plate 460, if the window 462 is urged to withdraw from the lifter plate 460, the undercuts 464 urge the window holding members 476 outwards in directions that are substantially parallel to the plane of the first side wall 472. A pair of window holding member locking surfaces 480 that are present on the first side wall 472 prevent the window holding members 476 from deflecting out of the way. The first and second window holding members 476 thus hold the window 462 in place.

Figure 44:
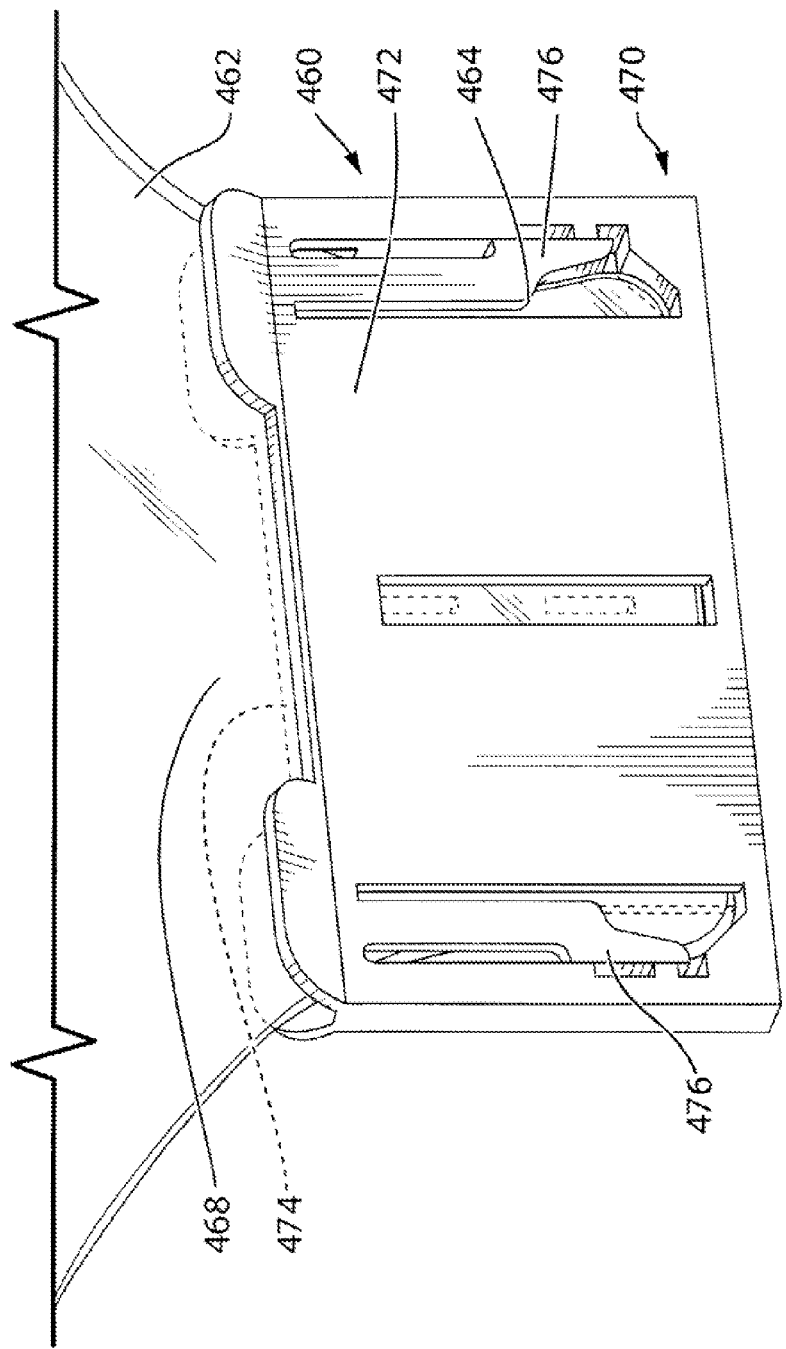
FIG. 44 is a perspective view of the lifter plate shown in FIG. 43 with a vehicle window inserted therein.

It will be noted that, while the embodiment shown in FIGS. 43 and 44 includes a pair of window holding members 476 which engage a pair of undercuts 464, it is alternatively possible to provide more or fewer undercuts and corresponding window holding members 476. It is possible for example, to include a single undercut 464 and a single window holding member 476.

Figure 10:
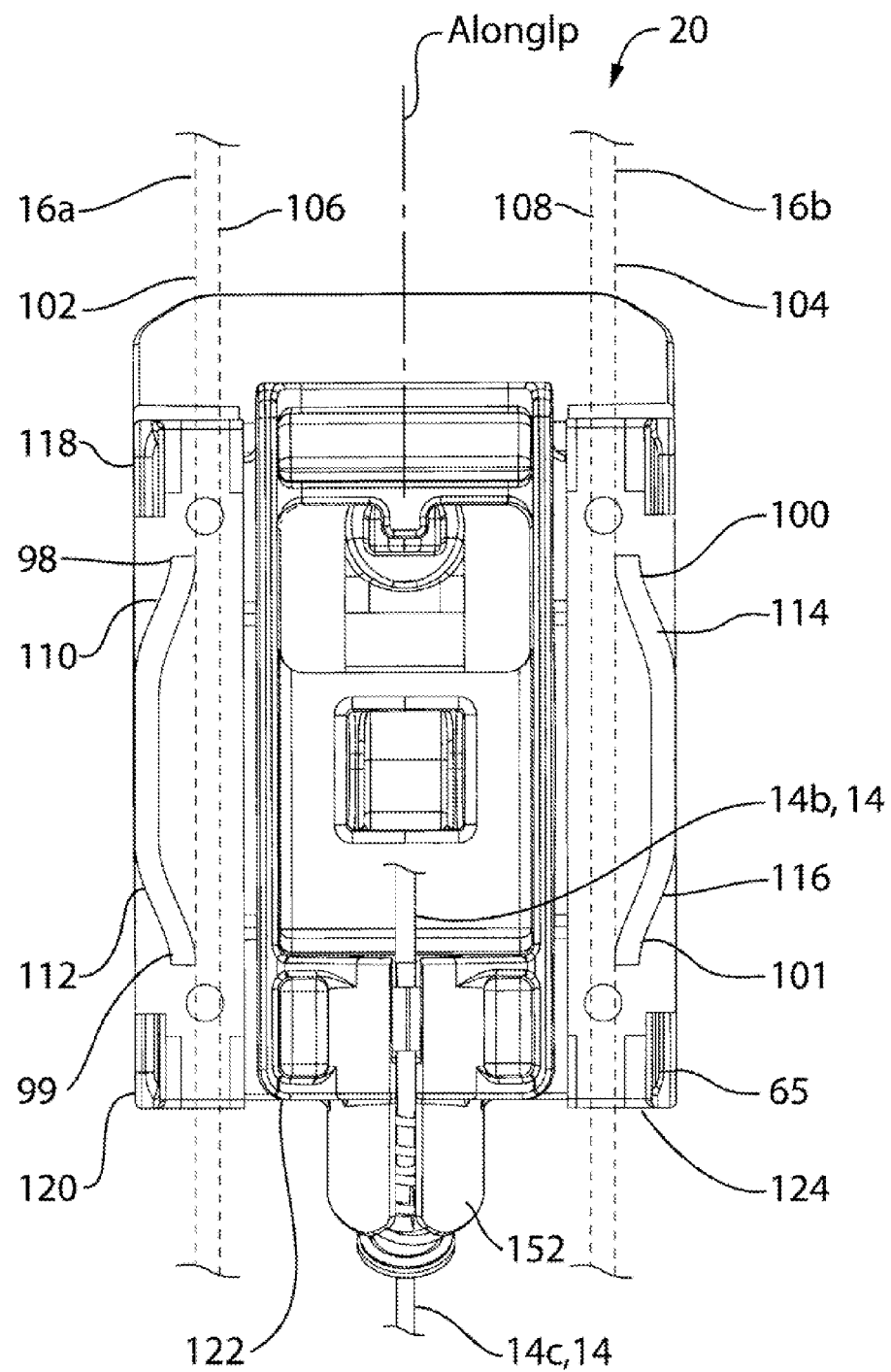
FIG. 10 is a plan view of the lifter plate shown in FIGS. 9a and 9b.

Reference is made to FIG. 10. The lifter plate 20 has a longitudinal axis Alonglp. The lifter plate body 65 includes a first forward lateral guide surface engager 98, a first rearward lateral guide surface engager 99, a second forward lateral guide surface engager 100 and a second rearward lateral guide surface engager 101. The first lateral guide surface engagers 98 and 99 and the second lateral guide surface engagers 100 and 101 are positioned to engage a first lateral guide surface 102 and a second lateral guide surface 104 respectively, for guiding movement of the lifter plate 20 in the longitudinal direction. The first and second lateral guide surfaces 102 and 104 are surfaces on the first and second rails 16a and 16b. The first and second lateral guide surfaces 102 and 104 are parallel to each other, and face in opposite directions to each other. In the embodiment shown in FIG. 10, the first and second lateral guide surfaces 102 and 104 are the outer side surfaces of the rails 16a and 16b. In an alternative embodiment, however, the inner side surfaces of the rails 16a and 16b, shown at 106 and 108 respectively, could act as first and second lateral guide surfaces, and the first and second lateral guide surface engagers 98 and 100 could be positioned to engage them, instead of engaging the outer side surfaces 102 and 104.

The lifter plate 20 may include a first forward lateral guide surface engager biasing member 110, a first rearward lateral guide surface engager biasing member 112, a second forward lateral guide surface engager biasing member 114 and a second rearward lateral guide surface engager biasing member 116, each of which is positioned to bias its associated lateral guide surface engager 98, 99, 100 or 101 towards the lateral guide surface 102 or 104 associated therewith.

The biasing members 110, 112, 114 and 116 permit the forward and rearward portions of the lifter plate 20, shown at 118 and 120 respectively to accommodate some movement in the lateral direction, in the event of forces urging the lifter plate 20 in that manner, while maintaining engagement with the first and second lateral guide surfaces 102 and 104. By permitting the lifter plate 20 to accommodate such movement, the likelihood of binding of the lifter plate 20 during its travel along the rails 16a and 16b is reduced, in the event of uneven forces on the lifter plate 20 during use. By reducing the likelihood of binding during use, BSR (buzz, squeak and rattle) that may be associated with operation of the lifter plate 20 may be reduced. Additionally, in embodiments wherein the likelihood of binding is sufficiently low, the drive motor 12 (FIG. 1) that can be provided may be relatively less expensive than would otherwise be required.

It has been shown in FIG. 10 for the lifter plate 20 to include a forward set of lateral guide surface engagers including first and second forward lateral guide surface engagers 98 and 100 and a rearward set of lateral guide surface engagers including first and second rearward lateral guide surface engagers 99 and 101. It is alternatively possible for the lifter plate 20 to include more or fewer sets of lateral guide surface engagers and associated biasing members. For example, the lifter plate 20 could include a single set of first and second lateral guide surface engagers. By having two sets of lateral guide surface engagers (ie. the forward set of lateral guide surface engagers 98 and 100 and the rearward set of lateral guide surface engagers 99 and 101), the overall surface area of contact between the lifter plate 20 and the lateral guide surfaces 102 and 104 is lower than would be necessary if the lifter plate 20 only had a single first lateral guide surface engager and a single second lateral guide surface engager. This is because if only a single first lateral guide surface engager and a single second lateral guide surface engager were provided, one or both of them would have to be relatively long to stabilize the lifter plate 20 and prevent it from rotating in the lateral/longitudinal plane (ie. the plane that is generally parallel to the first and second side walls 66 and 68) due to any uneven forces that arise during use. Having a reduced area of contact between the lifter plate 20 and the lateral guide surfaces 102 and 104 reduces the frictional drag on the lifter plate 20 during its travel up and down the rails 16a and 16b. The reduced frictional drag, in turn, can reduce BSR that may be associated with the lifter plate 20. Additionally, the reduced frictional drag may result in sufficiently lower load on the drive motor 12 (FIG. 1), that a less expensive motor, that may be, for example, less powerful and/or smaller, may be used in the window regulator assembly 10.

It has been shown for the right side lateral guide surface engagers (ie. the first side lateral guide surface engagers 98 and 99) to include first lateral guide surface engager biasing members 110 and 112, and for the left side lateral guide surface engagers (ie. the second lateral guide surface engagers 100 and 101) to include first lateral guide surface engager biasing members 114 and 116. It is alternatively possible, however, for only one side to have biasing members on the lateral guide surface engagers. For example, the second lateral guide surface engagers 100 and 101 could alternatively be fixedly mounted to the lifter plate body 65, so that only the first lateral guide surface engagers 98 and 99 have biasing members associated therewith. Having forward and rearward biasing members on one side only, eg. the right side, shown at 122, still permit the lifter plate 20 to accommodate uneven forces exerted thereon during use, that might urge the lifter plate 20 to rotate in the lateral/longitudinal plane. It will be understood that it is possible instead to have the single forward and rearward biasing members on the left side, shown at 124. It will further be understood that, in an embodiment wherein there is only one first lateral guide surface engager and one second lateral guide surface engager, it is optionally possible to fixedly connect one of them to the lifter plate body 20 and to provide a biasing member for the other.

Referring to FIG. 2, in addition to being guided with lateral guide surfaces 102 and 104, the lifter plate 20 is also guided by a movement-plane guide surface 126, which may be made up of a first window-movement-plane guide surface portion 126a and a second window-movement-plane guide surface portion 126b. The guide surface 126 is referred to as a window-movement-plane guide surface 126 because it assists in defining the plane of movement of the vehicle window 11.

Instead of the two window-movement-plane guide surface portions 126a and 126b being separate from each other, it is alternatively possible to configure the rails 16a and 16b to instead be a single wide rail with a single contiguous window-movement-plane guide surface 126.

Figure 11:
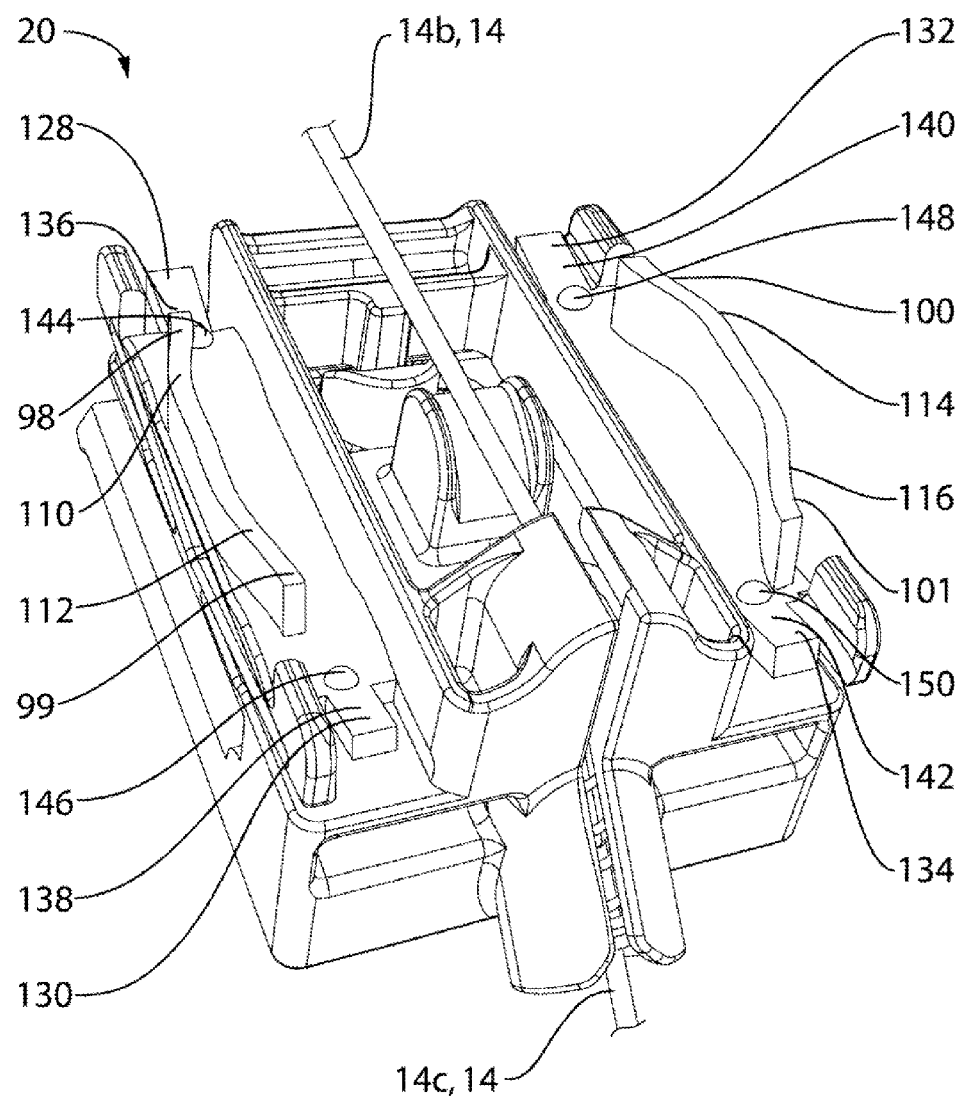
FIG. 11 is another magnified perspective view of the lifter plate shown in FIGS. 9a and 9b.
Figure 12:
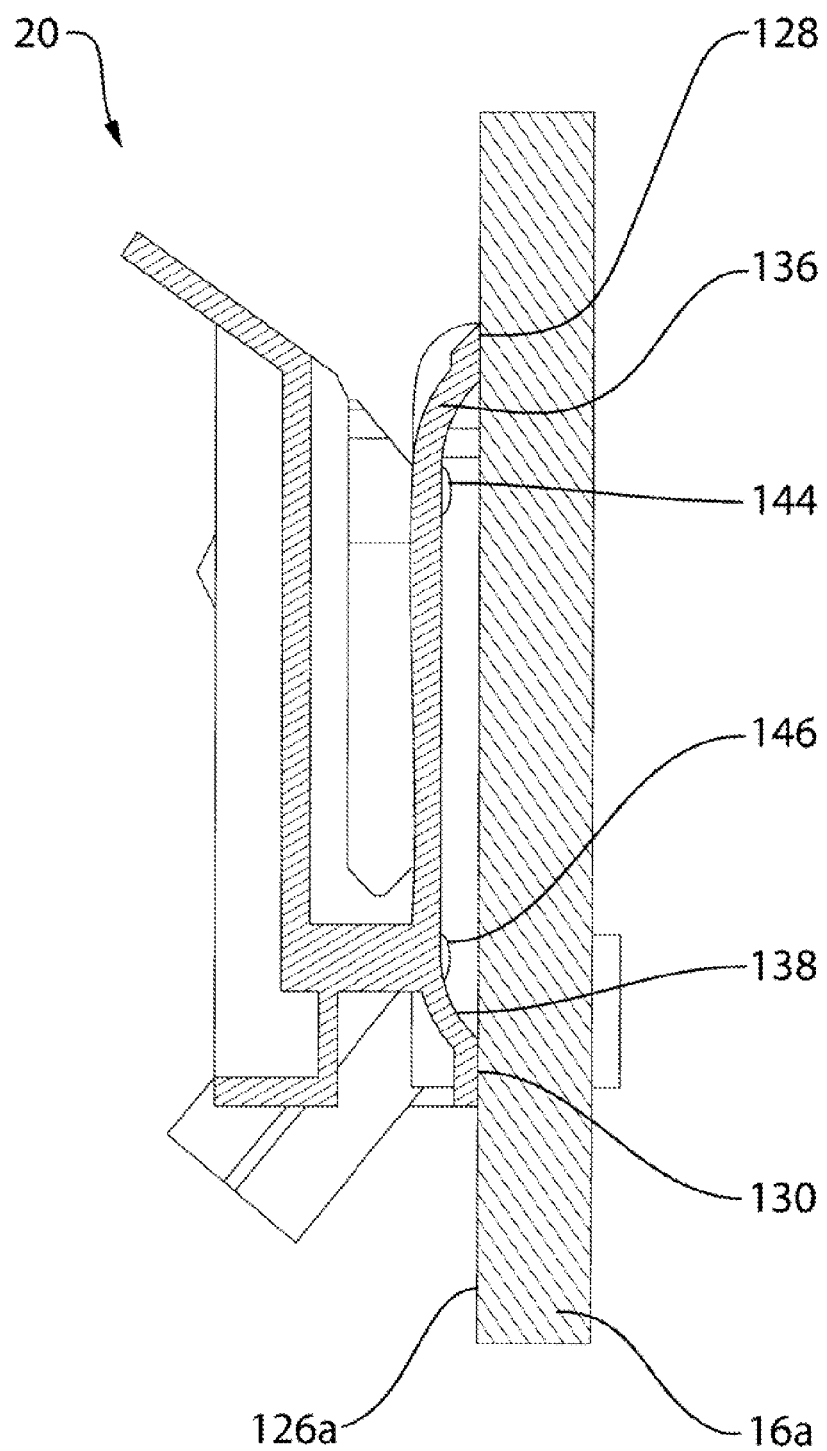
FIG. 12 is a sectional view along section line 13-13 shown in FIG. 10.

Referring to FIG. 11, to engage the window-movement-plane guide surface 126 (FIG. 2), the lifter plate 20 may further include a first forward window-movement-plane guide surface engager 128, a first rearward window-movement-plane guide surface engager 130, a second forward window-movement-plane guide surface engager 132 and a second rearward window-movement-plane guide surface engager 134. The first forward and rearward window-movement-plane guide surface engagers 128 and 130 are positioned to engage the window-movement-plane guide surface portion 126a (FIG. 2). The second forward and rearward window-movement-plane guide surface engagers 132 (FIG. 11) and 134 (FIG. 11) are positioned to engage the window-movement-plane guide surface portion 126b (FIG. 2). A sectional view illustrating the engagement of the first forward and rearward window-movement-plane guide surface engagers 128 and 130 with the window-movement-plane guide surface portion 126a on the rail 16a is shown in FIG. 12.

Referring to FIG. 11, by having two or more longitudinally spaced window-movement-plane guide surface engagers, (ie. the forward window-movement-plane guide surface engager 128 or 132 and the rearward window-movement-plane guide surface engager 130 or 134), the overall surface area of contact between the lifter plate 20 and the window-movement-plane guide surface 126 (FIG. 2) is lower than would be necessary for stability if the lifter plate 20 only had a single window-movement-plane guide surface engager. Having a reduced area of contact between the lifter plate 20 and the window-movement-plane guide surface 126 reduces the frictional drag on the lifter plate 20 during its travel up and down the rails 16a and 16b. The advantages of reducing frictional drag on the lifter plate 20 have been explained above in relation to the engagement with the lateral guide surface engagers 98, 99, 100 and 101 (FIG. 11).

Similarly, by having two or more laterally spaced window-movement-plane guide surface engagers, (ie. a set comprising a left side window-movement-plane guide surface engager and a right side window-movement-plane guide surface engager), the overall surface area of contact between the lifter plate 20 and the window-movement-plane guide surface 126 is lower than would be necessary for stability if the lifter plate 20 only had a single window-movement-plane guide surface engager.

Thus, it is particularly advantageous with respect to reduced surface area of contact to have two laterally spaced forward window-movement-plane guide surface engagers 128 and 132 (FIG. 11), and two laterally spaced rearward window-movement-plane guide surface engagers 130 and 134 that are longitudinally spaced from the forward window-movement-plane guide surface engagers 128 and 132.

A first forward window-movement-plane guide surface engager biasing member 136, a first rearward window-movement-plane guide surface engager biasing member 138, a second forward window-movement-plane guide surface engager biasing member 140 and a second rearward window-movement-plane guide surface engager biasing member 142 may be provided to bias the window-movement-plane guide surface engagers 128, 130, 132 and 134 towards the window-movement-plane guide surface 126. By providing the biasing members 136, 138, 140 and 142, the lifter plate 20 is capable of accommodating some forces urging it into the window-movement-plane guide surface 126 without binding on the window-movement-plane guide surface 126.

If forces acting on the lifter plate 20 cause a selected degree of flexion in any of the window-movement-plane guide surface engager biasing members 136, 138, 140 or 142, the lifter plate 20 includes secondary window-movement-plane guide surface engagers 144, 146, 148 and 150 which engage the window-movement-plane guide surface 126 (FIG. 2), thereby preventing further flexion of the associated window-movement-plane guide surface engager biasing member 136, 138, 140 or 142. FIG. 12 shows the secondary window-movement-plane guide surface engagers 144 and 146 in particular. Referring to FIG. 11, in embodiments wherein the secondary window-movement-plane guide surface engagers 144, 146, 148 and 150 are provided, it is appropriate to refer to the window-movement-plane guide surface engagers 128, 130, 132 and 134 as primary window-movement-plane guide surface engagers.

The secondary window-movement-plane guide surface engagers 144, 146, 148 and 150 are configured to each have a relatively small contact surface area, so that the frictional drag on the lifter plate 20 is not unduly increased as a result of their engagement with the window-movement-plane guide surface 126 (FIG. 2).

It will be noted that, although the lifter plate 20 is 'captured' laterally by the opposing lateral guide surfaces 102 and 104 (FIG. 10), it is not 'captured', however, by opposing window-movement-plane surfaces. The lifter plate 20 is nonetheless prevented from movement relative to the window-movement plane (ie. towards or away from the window-movement plane) by virtue of its connection to the vehicle window 11, which itself is prevented from movement relative to the window-movement-plane by the glass run channels, one of which is shown at 151 in FIG. 1.

Reference is made to FIG. 14. The lifter plate 20 includes a first cable mount 152 and a second cable mount 154 for receiving the ends of the cables 14a and 14c, which have ferrules 156 and 158 mounted thereon respectively. In the embodiment shown in FIG. 14, the cable mount 152 includes an optional cable end biasing member 160, that acts to cushion the engagement between the drive cables 14a and 14c and the lifter plate 20 to reduce the likelihood of damage to the lifter plate 20 during sudden changes in forces acting thereon by the cables 14a and 14c. For example, when the window regulator assembly 10 (FIG. 1) is actuated, there will be an initial jerk by one of the cables 14a or 14c on the lifter plate 20, and an initial resistive force acting on the lifter plate 20 by the other of the cables 14a or 14c. The cable end biasing member 160 absorbs at least some of the energy of the jerk to inhibit damage to the lifter plate 20. It will be noted that this single cable end biasing member 160 absorbs jerk energy regardless of whether the motive jerk is exerted by the cable 14c or whether the motive jerk is exerted by the cable 14a. Additionally, the biasing member 160, which may be, for example, a compression spring, acts to maintain the associated cable 14c in tension during upward movement of the window 11

Referring to FIG. 10, the cable mounts 152 and 154 are both positioned laterally between the first set of lateral guide surface engagers 98 and 99 and the second set of lateral guide surface engagers 100 and 101, which reduces any net moments exerted on the lifter plate 20 by the cables 14a and 14c in the lateral/longitudinal plane, thereby reducing frictional drag on the lifter plate 20 during movement of the lifter plate 20 on the rails 16a and 16b.

In a particularly preferred embodiment, it is optionally possible for the cable mounts 152 and 154 to in line with each other, in the sense that they have the same lateral position as each other. In other words, they both have the same distance to the first set of lateral guide surface engagers 98 and 99. It will be noted that this does not necessarily mean that they are laterally centered between the first and second sets of lateral guide surface engagers 98 and 99, and 100 and 101. It means instead that if the first cable mount 152 is 1 inch, as an example, from the first set of lateral guide surface engagers 98 and 99, then the second cable mount 154 is also 1 inch from the first set of lateral guide surface engagers 98 and 99. As a result of their having the same lateral position, the net moment being exerted on the lifter plate 20 by the cables 14a and 14c during movement of the lifter plate 20 is relatively lower than embodiments wherein the first and second cable mounts 152 and 154 occupy different lateral positions than each other.

In a more particularly preferred embodiment, the cable mounts 152 and 154 are both centered between the first and second sets of lateral guide surface engagers 98 and 99, and 100 and 101. By centering both cable mounts 152 and 154 in this way, the net moment caused by the cables 14a and 14c on the lifter plate 20 in the lateral/longitudinal plane is theoretically zero. In practice the net moment in this more particularly preferred embodiment may be some non-zero value due to tolerances and the like, however, it is expected that it is a relatively small value relative to other optional embodiments described above.

Figure 13:
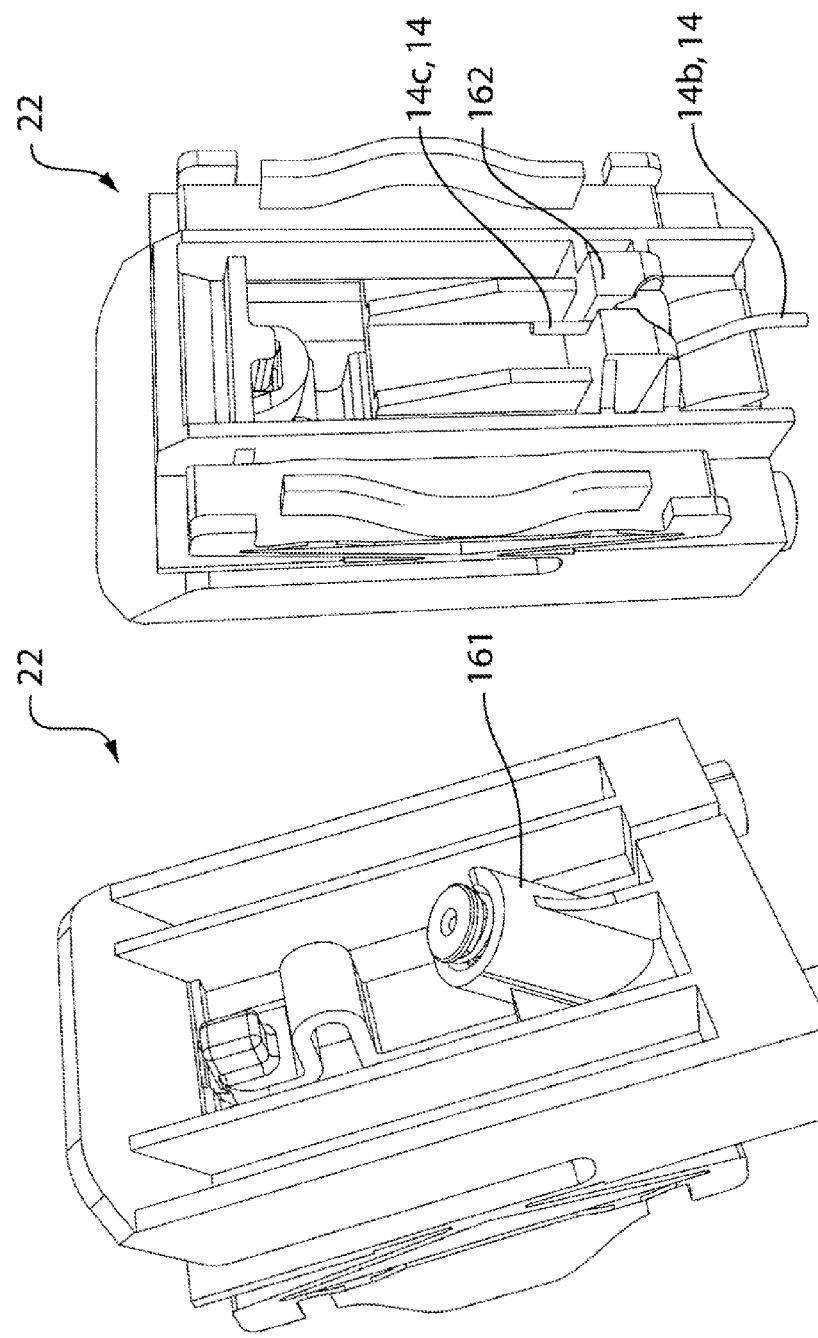
FIGS. 13a and 13b are perspective views of another lifter plate that is part of the window regulator assembly shown in FIG. 1.

Referring to FIGS. 13a and 13b, the second lifter plate 22 may be similar to the first lifter plate 20, with some difference optionally being present in the configuration of the cable mounts, shown at 161 and 162. A spring (not shown) is optionally provided in the cable mount 161 to provide similar function (eg. tensioning of the cable 14c).

Figure 16:
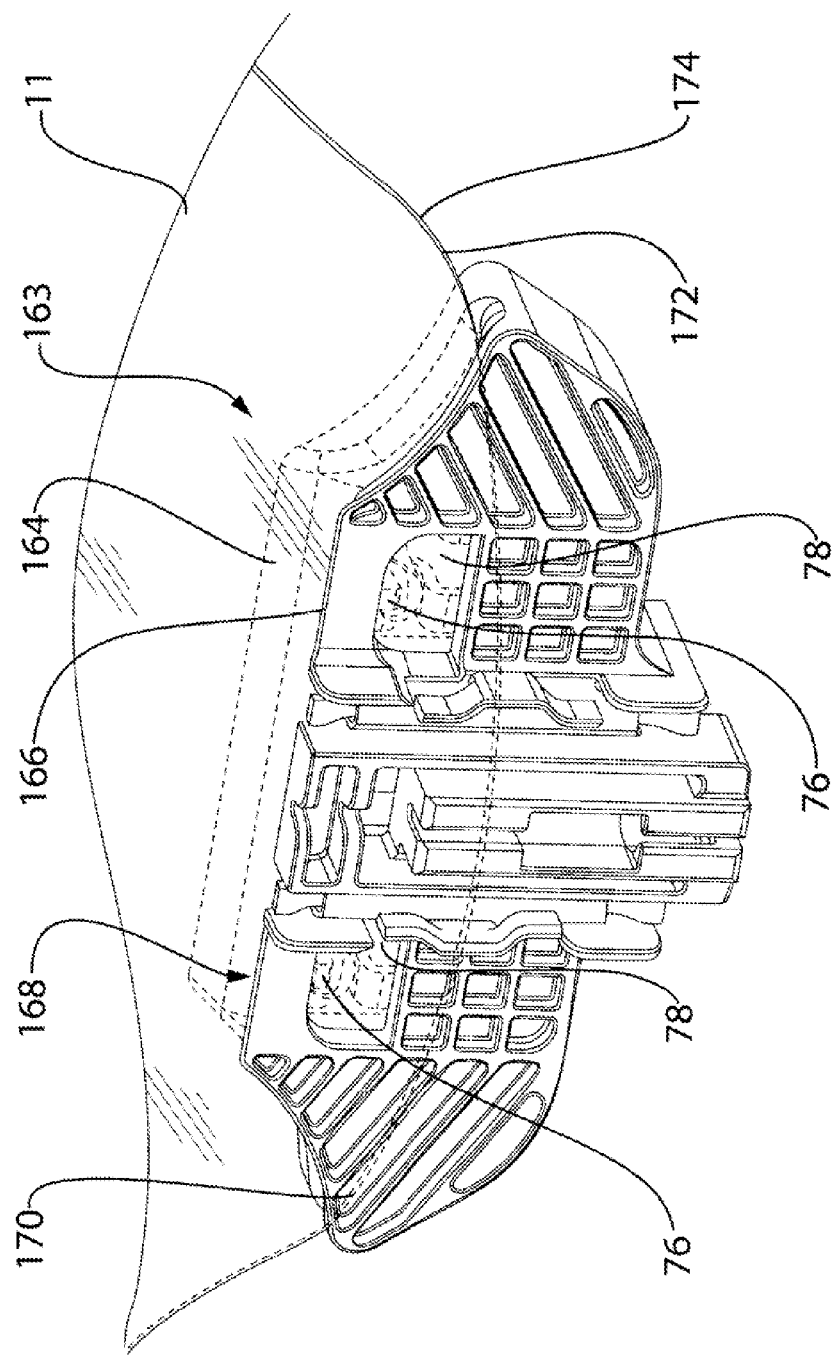
FIG. 16 is a magnified perspective view of an alternative lifter plate for use with the window regulator assembly shown in FIG. 1.

Reference is made to FIG. 16, which shows an alternative lifter plate 163 in accordance with another embodiment of the present invention. The lifter plate 163 may be similar to the lifter plates 20 and 22 (FIGS. 9a and 13a), except that the lifter plate 163 is particularly configured for use with a rear window of a vehicle. To this end, the lifter plate 163 includes additional features, such as a second window pass-through member 76 which passes through a second locking aperture 78 on the vehicle window 11. The lifter plate 163 may be similar to two lifter plates 20 (or 22) connected together for connecting to two locking apertures 78 that are proximate to each other on the vehicle window 11, thereby strengthening the connection to the vehicle window 11. However, the lifter plate 163 is configured to engage only one set of guide rails. Additionally, the side walls of the lifter plate 163, shown at 164 and 166, define a channel 168 that has a curved bottom face 170 so as to be configured to mate with the curved bottom edge 172 of a mounting ear 174 on the vehicle window 11 that contains the two locking apertures 78. By configuring the channel 168 to mate with the mounting ear 174, the lifter plate 163 is more easily adjusted to the correct position to align the window pass through members 76 with the locking apertures 78 of the vehicle window 11.

Figure 17:
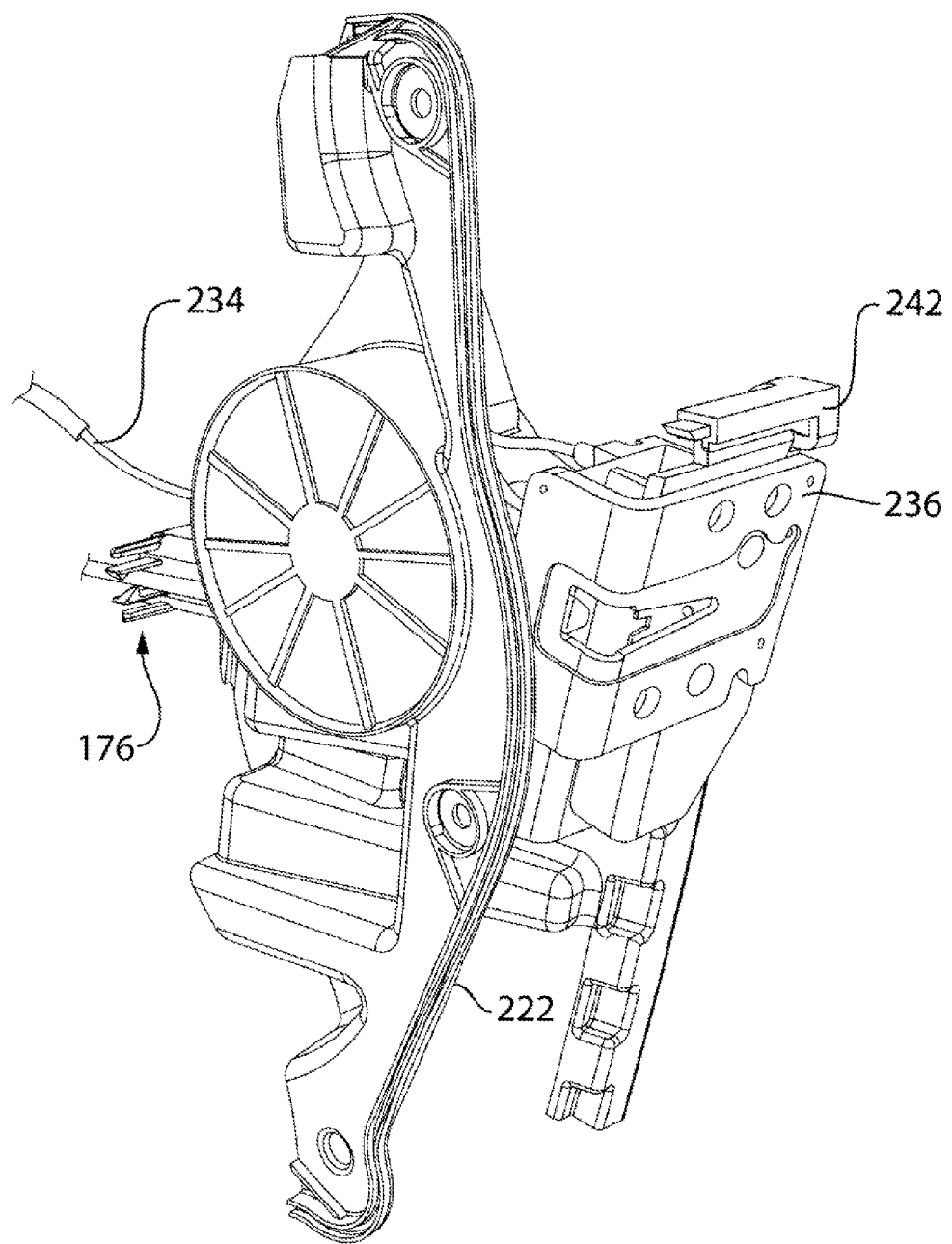
FIG. 17 is a perspective view of the window regulator assembly shown in FIG. 1, illustrating wiring harness clips in accordance with another aspect of the present invention.
Figure 18:
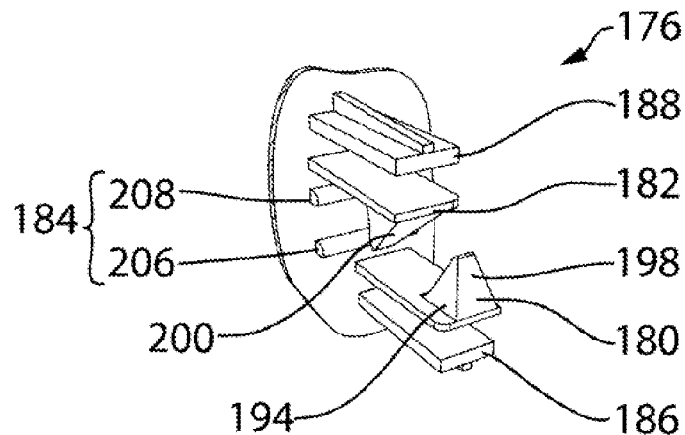
FIG. 18 is a magnified perspective view of one of the wiring harness clips shown in FIG. 17.
Figure 19:
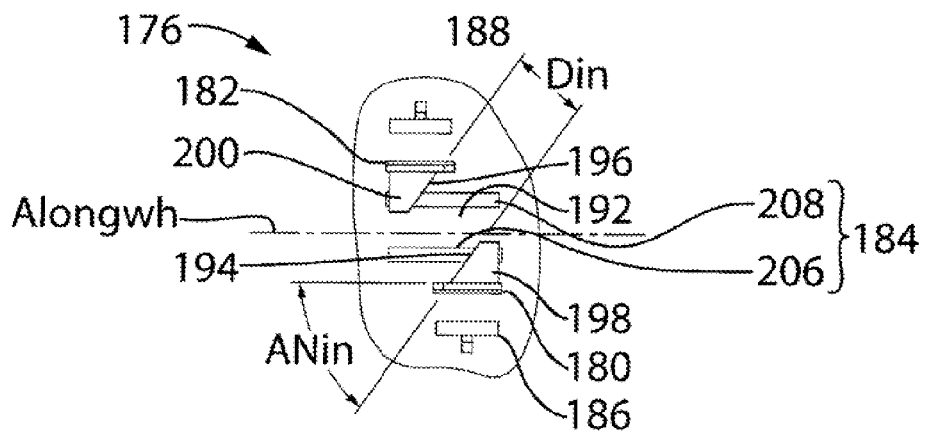
FIG. 19 is a plan view of the wiring harness clip shown in FIG. 18.

Reference is made to FIG. 17, which shows a wiring harness clip 176 on the carrier 15 that may be used to hold a wiring harness, shown at 178. The wiring harness 178 may be sheathed to facilitate its handling. The wiring harness clip 176 is shown in more detail in FIG. 18. The wiring harness clip 176 includes a first clip element 180, a second clip element 182, a wiring harness guide 184, a first clip element guard 186 and a second clip element guard 188. Referring to FIG. 19, the first and second clip elements 180 and 182 are spaced from each other and are together configured to retain the wiring harness 178 in a longitudinal orientation along a longitudinal axis Alongwh. In particular, the first and second clip elements 180 and 182, along with the wiring harness guide 184, together define a longitudinally oriented wiring harness retaining aperture 190, shown in FIG. 20, and in this way define the longitudinal axis Alongwh.

Figure 20:
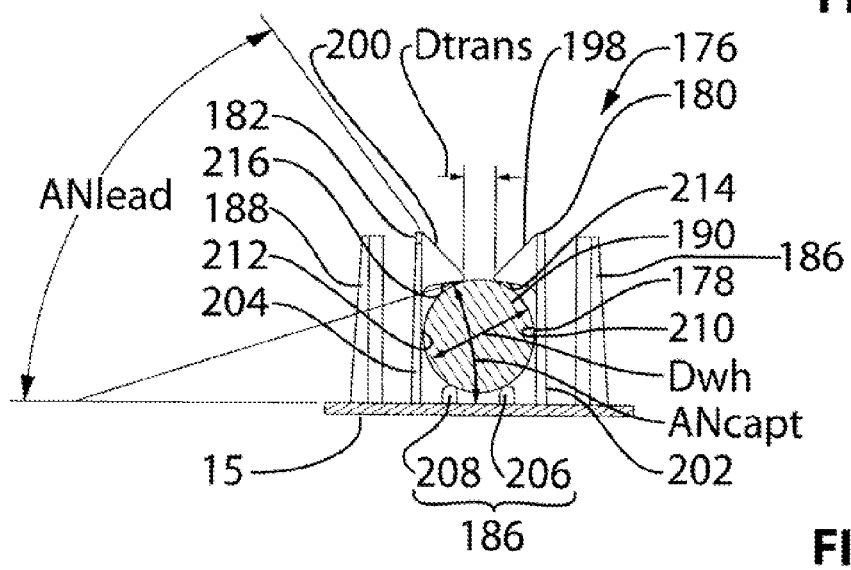
FIG. 20 is an elevation view of the wiring harness clip shown in FIG. 18, showing a wiring harness captured therein.

The first and second clip elements 180 and 182 also define an inlet 192, shown in FIG. 19. More particularly, the inlet 190 is defined by a first clip element inlet defining surface 194 and a second clip element inlet defining surface 196. The first and second clip element inlet defining surfaces 194 and 196 are parallel and are spaced from each other by a selected distance Din, which may be smaller by a selected amount than the diameter of the wiring harness 178, shown at Dwh (FIG. 20). Additionally, the first and second clip element inlet defining surfaces 194 and 196 are positioned at a selected non-zero angle ANin (FIG. 19) from the longitudinal axis Alongwh.

The first and second clip elements 180 and 182 further include lead-in surfaces 198 and 200 respectively (best seen in FIG. 20), each of which extends at a selected angle ANlead from the surface of the carrier 15 to facilitate entry of the wiring harness 178 into the inlet 192 (FIG. 19).

Figure 21:
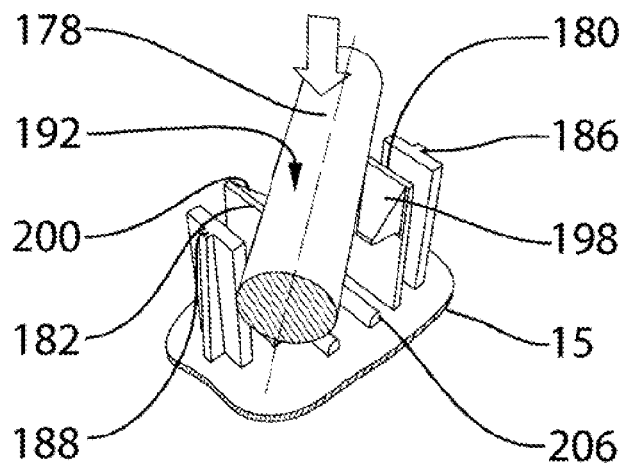
FIG. 21 is a perspective view of the wiring harness clip shown in FIG. 18, with a wiring harness at a first stage of mounting therein.
Figure 22:
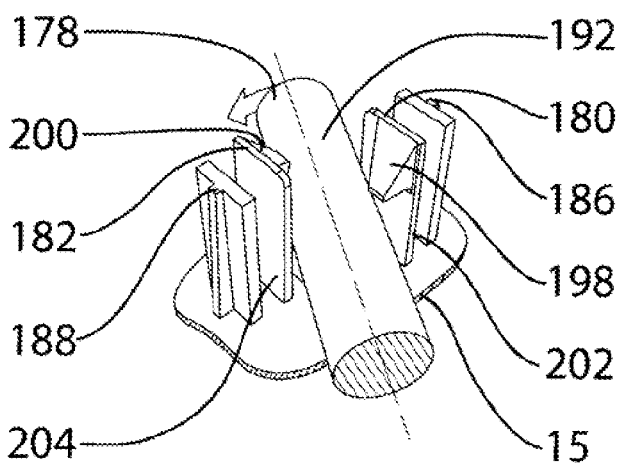
FIG. 22 is a perspective view of the wiring harness clip shown in FIG. 18, with the wiring harness at a second stage of mounting therein.

The first and second clip elements 180 and 182 include portions that act as first and second clip element biasing members 202 and 204 respectively to urge the first and second clip elements 180 and 182 towards a closed position around the wiring harness 178 (FIG. 20). When the wiring harness 178 is introduced into the inlet 192, as shown in FIG. 21, the engagement with the lead-in surfaces 198 and 200 pushes the first and second clip elements 180 and 182 apart against the biasing members 202 and 204. Once the wiring harness 178 is inserted and is captured by the first and second clip elements 180 and 182 (see FIG. 22) it can be rotated so that it is held in alignment with the longitudinal axis Alongwh by the wiring harness guide 184. The guide 184 includes a first longitudinally extending guide element 206 and a second longitudinally extending guide element 208 that is spaced from the first longitudinally extending guide element 206. The guide elements 206 and 208 may be elongate bars that engage the wiring harness 178 (see FIG. 20) along their lengths, at selected points on the perimeter of the wiring harness 178 so as to provided a selected degree of resistance to twisting of the wiring harness 178 out of its longitudinal alignment, once it is in place.

Figure 23:
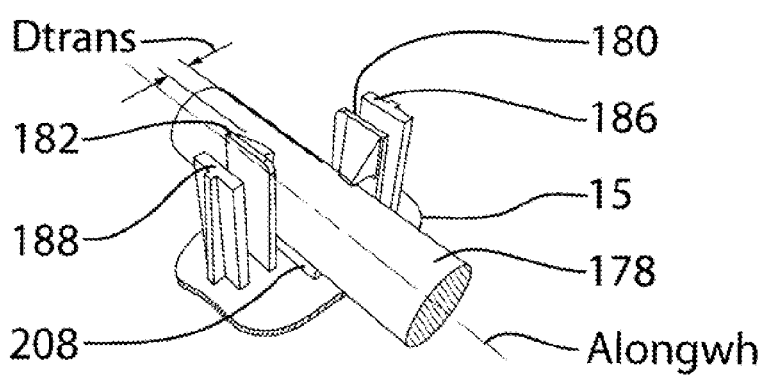
FIG. 23 is a perspective view of the wiring harness clip shown in FIG. 18, with the wiring harness at a near final stage of mounting therein.

The distance between the first and second clip elements 180 and 182 in a transverse direction (see FIG. 20) is shown at Dtrans and is sufficiently small to inhibit the inadvertent removal of the wiring harness 178 when it is aligned in a longitudinal direction (see FIG. 23). In particular, the distance Dtrans is smaller than the distance Din, which means that it is relatively easier to introduce the wiring harness 178 into the inlet 192 and relatively harder to remove an installed wiring harness 178.

The capture surfaces of the first and second clip elements 180 and 182 include lateral capture surfaces 210 and 212 which resist lateral movement of the wiring harness 178, and window-movement-plane capture surfaces 214 and 216, which resist direct withdrawal of the wiring harness 178 away from the carrier 15. The window-movement-plane capture surfaces 214 and 216 each extend at a selected angle ANcapt relative to the carrier 15. The angle ANcapt is selected so that a force in a direction perpendicular to the plane of the carrier 15, which would urge direct withdrawal of the wiring harness 178 from the wiring harness clip 176, results in a relatively low moment acting on the first and second clip elements 180 and 182 to urge them apart against the biasing members 202 and 204.

The first and second clip element guards 186 and 188 are positioned to inhibit damage to the first and second clip elements 180 and 182 during installation and use of the wiring harness clip 176.

The wiring harness clip 176 may be configured to be manufactured easily using from a suitable polymeric material, using an injection molding process with a simple mold plate arrangement requiring two mold plates. Thus, the manufacture of the wiring harness clip 176 can be effected relatively inexpensively.

The wiring harness clip 176 may be mounted to the carrier 15 (FIG. 17) by any suitable means, such as by a suitable adhesive, or by thermally joining it to the carrier 15.

It will be appreciated that the wiring harness clip 176 may be used to retain wiring harnesses 178 in areas of the vehicle outside the door assembly (not shown). For example, wiring harnesses 176 are generally run along paths throughout the vehicle to provide power to numerous elements, including, for example, the vehicle taillights. The wiring harness clip 176 could also be used in other structures, such as trailers.

Figure 24:
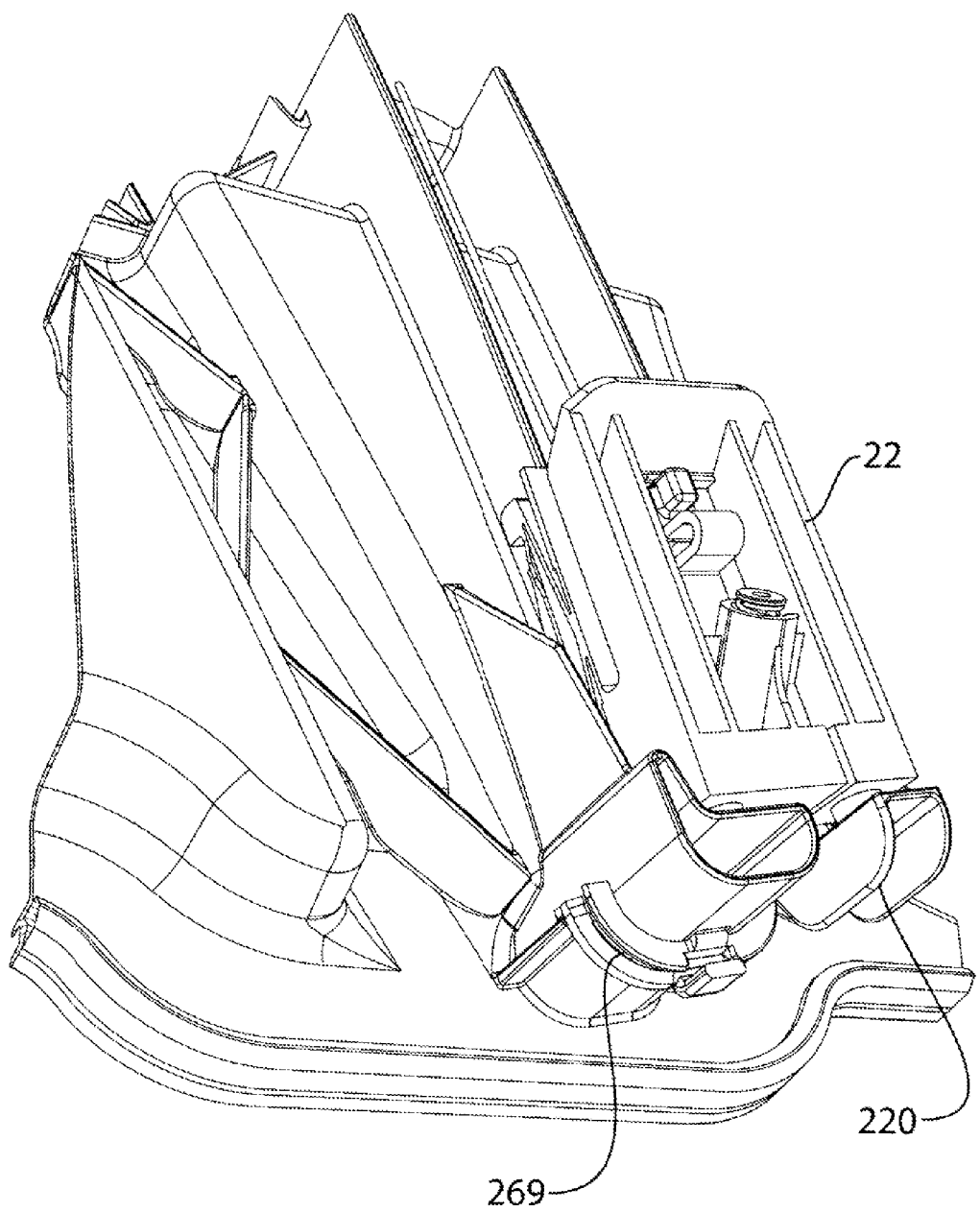
FIG. 24 is a magnified perspective view of a portion of a carrier shown in FIG. 1.

Reference is made to FIG. 1, which shows another feature that is integrally provided in the carrier 15, in accordance with another aspect of the present invention. The carrier 15 includes first and second integral down stops 218 and 220, which provide lower travel limits for the lifter plates 20 and 22 respectively. The down stop 220 is shown in further detail in FIG. 24.

Reference is made to FIG. 1, which shows yet another feature that is integrally provided in the carrier 15, in accordance with another aspect of the present invention. The carrier 15 includes a co-molded carrier seal, shown at 222, which is used to seal the carrier 15 with other elements of a door assembly (not shown). The carrier seal 222 may be made from any suitable material, such as a suitably soft compressible polymeric material. Co-molding the carrier seal 222 with the carrier body 24 reduces the cost of manufacture of the carrier 15, and may eliminate the need for a separate item (ie. a carrier seal) to be warehoused, and eliminates a manufacturing step in the manufacture of the carrier 15 (ie. the mounting of a carrier seal to the carrier body).

Figure 25:
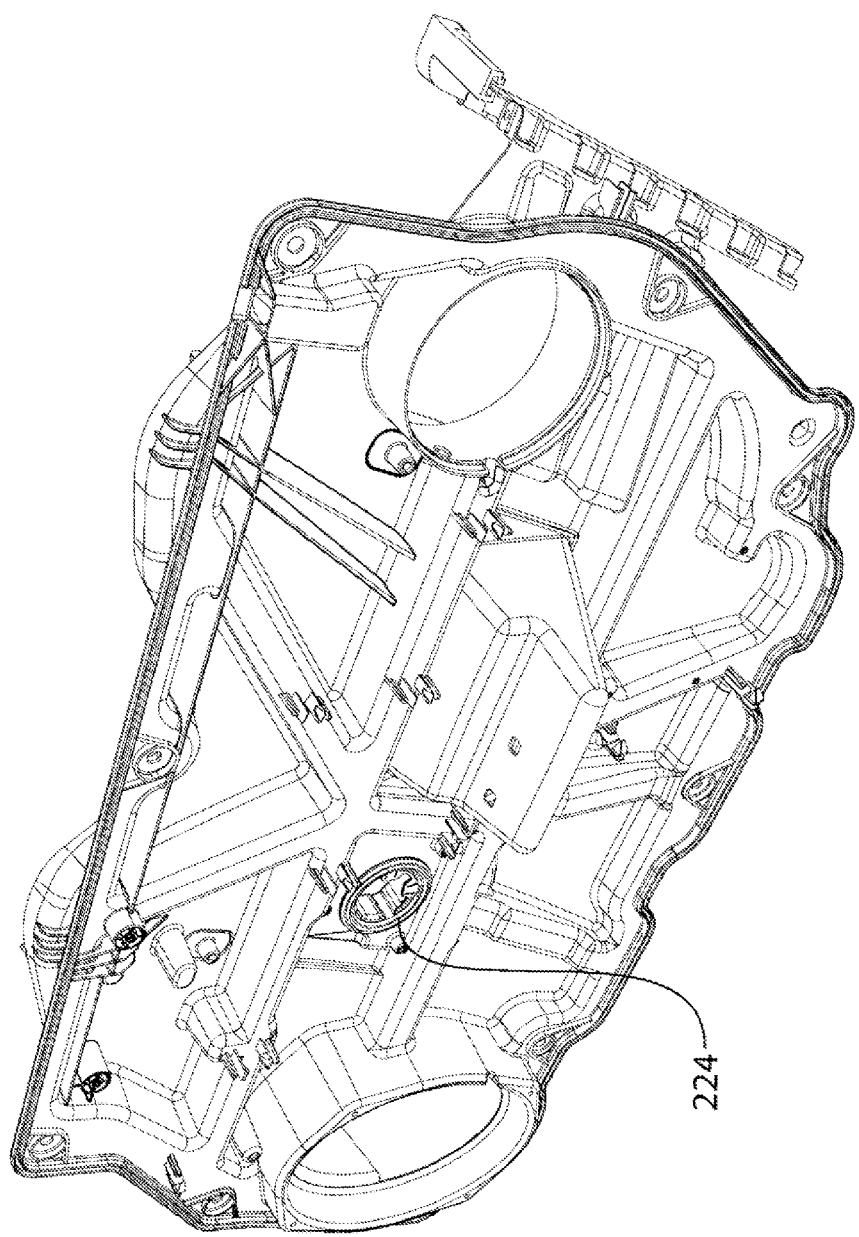
FIG. 25 is a perspective view of the carrier shown in FIG. 1, with components mounted thereto removed to highlight other aspects of the present invention.

Reference is made to FIG. 25, which shows a motor housing seal 224, which may additionally be co-molded with the carrier body 24, to similar advantage to the co-molding of the carrier seal 222.

Figure 26:
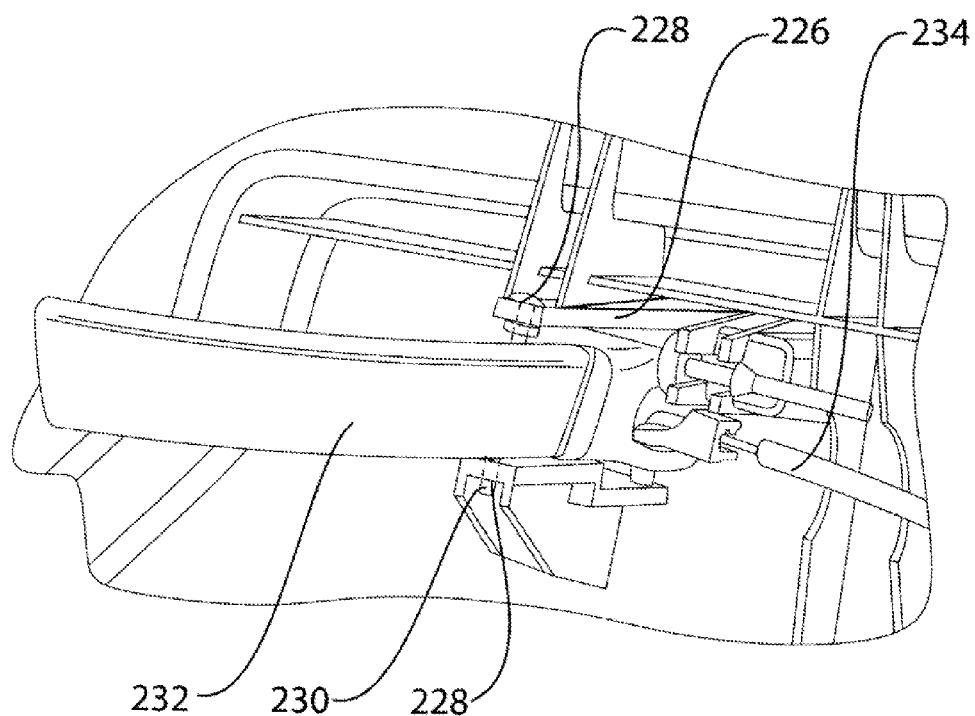
FIG. 26 is a magnified view of a portion of the carrier shown in FIG. 25, with a component mounted thereto.

Reference is made to FIG. 26, which shows an inside door handle mount 226 that is integral with the carrier body. To provide the inside door handle mount 226, a raw inside door handle mount is molded along with the carrier body 24. Pivot pin receiving apertures 228 are then machined or otherwise formed in the raw inside door handle mount to receive a pivot pin 230 for an inside door handle 232. Molding the raw inside door handle mount and then machining or otherwise forming the pivot pin receiving apertures 228 may be a relatively inexpensive way of providing the inside door handle mount 226, compared with providing a separate door handle mount that is then mounted to the carrier 15.

Figure 27:
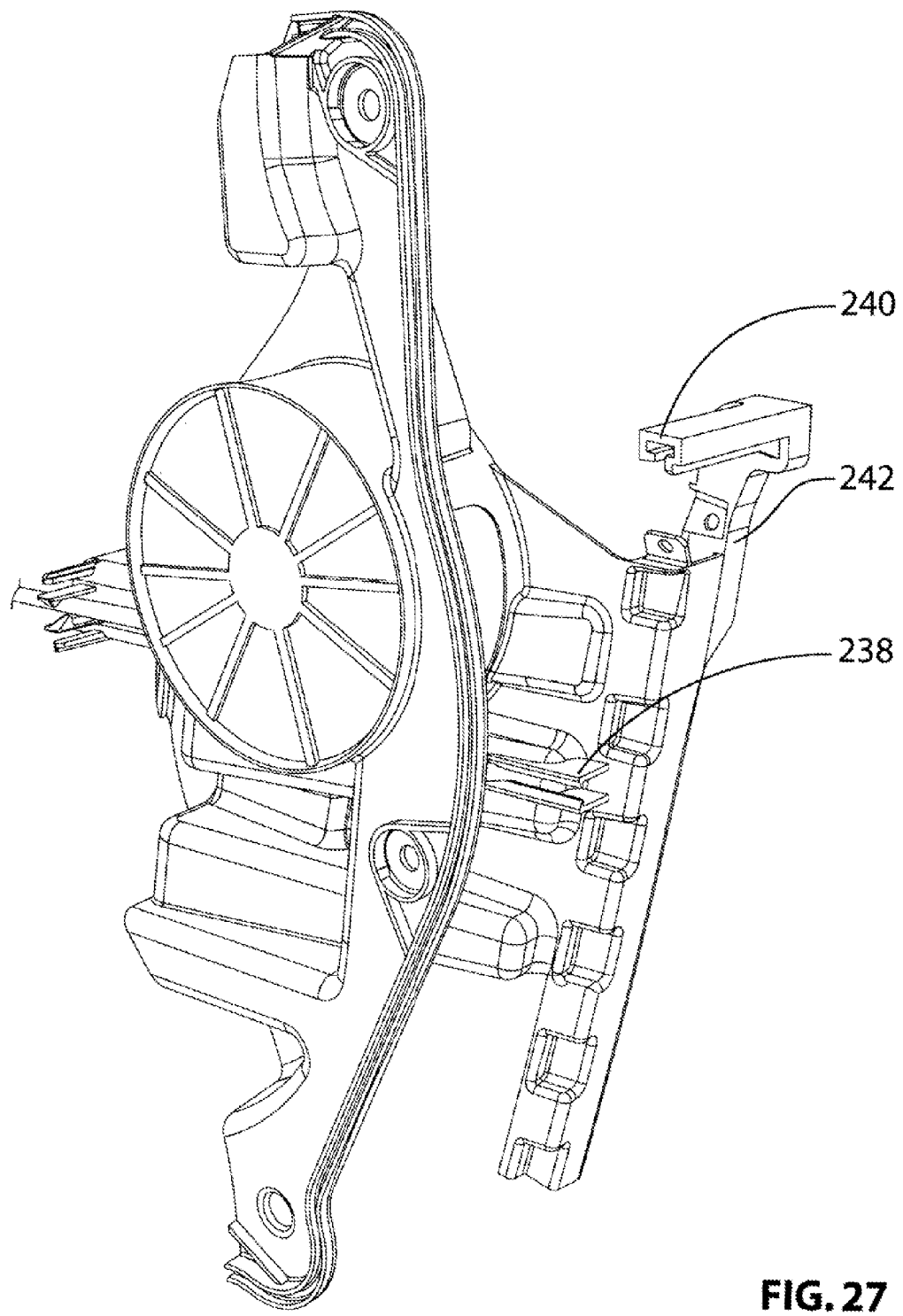
FIG. 27 is a magnified view of another portion of the carrier shown in FIG. 25, to illustrate another aspect of the present invention.

A door latch operator cable 234 may be connected between the door handle 232 and a door latch mechanism 236 (see FIG. 17). Referring to FIG. 27, the carrier 15 includes two latch mounts 238 and 240 on a latch presenter 242 that may be integrally connected with the carrier 15. The two latch mounts 238 and 240 help retain the latch in place on the carrier 15 until it is installed into the door assembly (not shown).

Figure 28:
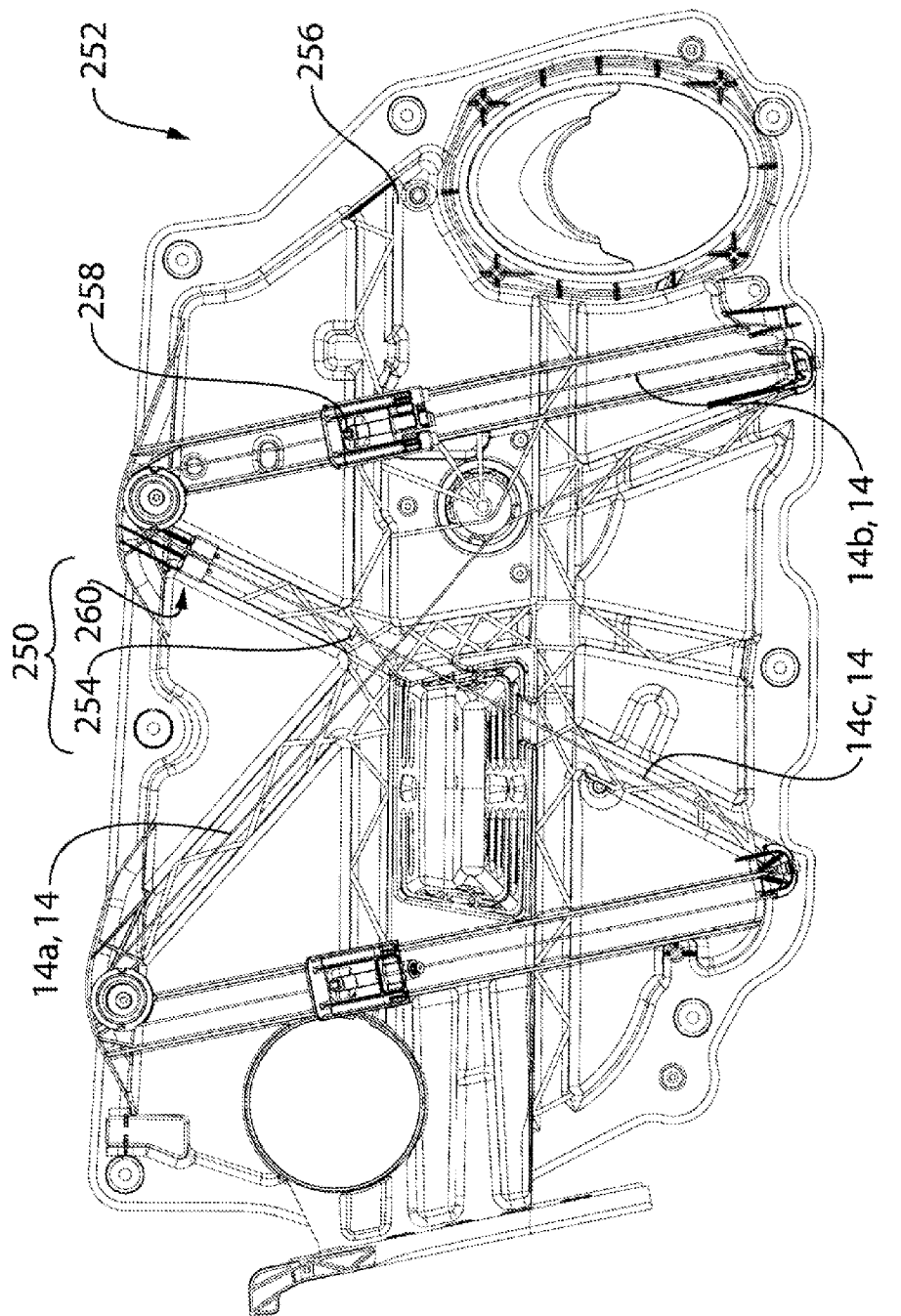
FIG. 28 is a perspective view of a window regulator system having a down stop system in accordance with another embodiment of the present invention.
Figure 29:
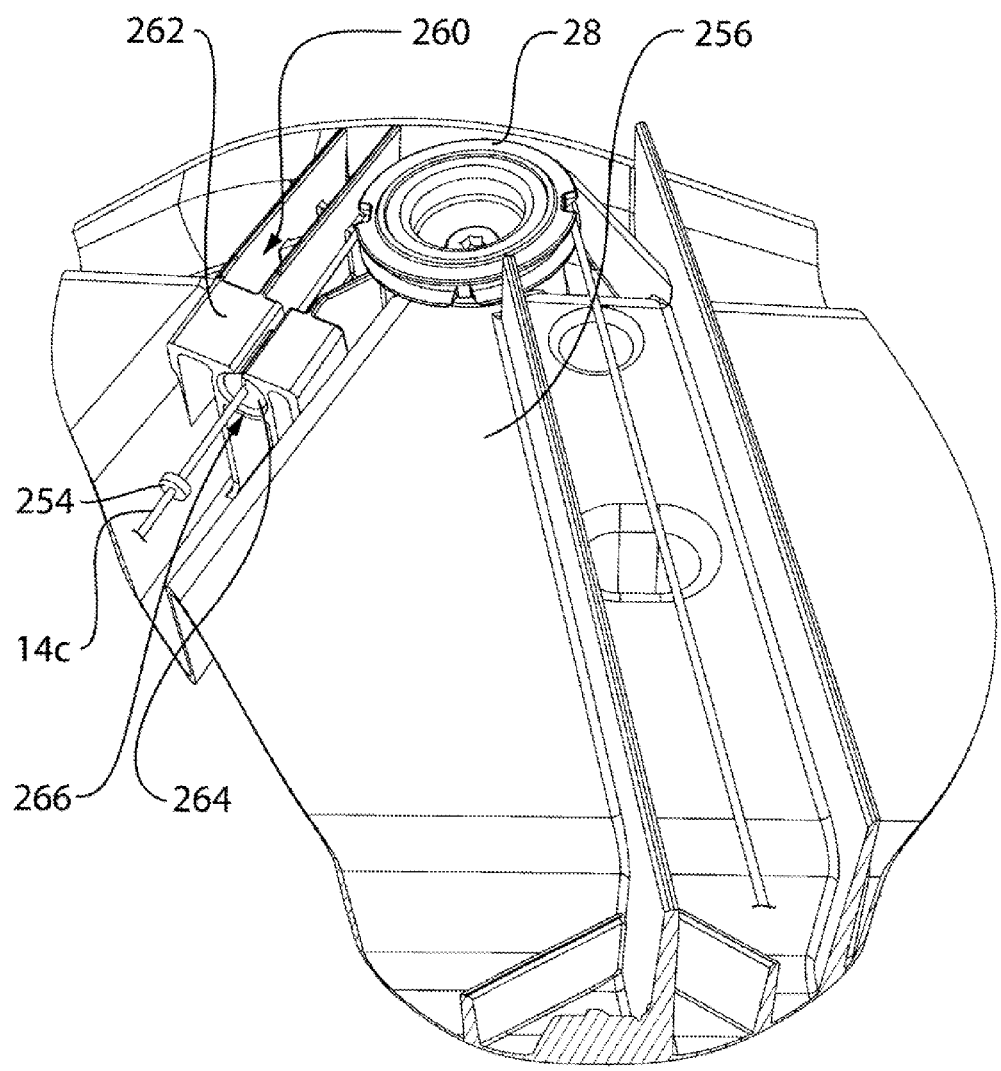
FIG. 29 is a magnified perspective view of the down stop system shown in FIG. 28.

Reference is made to FIG. 28, which shows an alternative down stop system 250 for use with a window regulator assembly 252. The window regulator assembly 252 may be similar to the window regulator assembly 10 (FIG. 1) except that it includes a ferrule 254 on the third cable 14c, a carrier 256 instead of the carrier 15 (FIG. 1), and a first lifter plate 258 instead of the first lifter plate 20, (FIG. 1). The ferrule 254 is positioned at a selected position on the third cable 14c. The carrier 256 may be similar to the carrier 15 (FIG. 1) except that the carrier 256 includes a down stop 260 that is positioned to stop the ferrule 254 on the third cable 14c when the lifter plates 20 and 22 have traveled downwards to a selected position on the rails 16 and 18. Referring to FIG. 29, the down stop 260 may include a down stop body 262 that is integrally connected with the carrier 256, and may further include a resilient, compressible bumper 264 that may be inserted into a receiving aperture 266 in the down stop body 262. The bumper 264 and the down stop body 262 are slotted to permit the introduction of the cable 14c therein during installation of the cable 14c on the carrier 256.

As a result of associating the down stop system 250 with one of the cables 14a, 14b or 14c (in the embodiment shown in FIG. 28 it is cable 14c), the first lifter plate 20 is not directly involved in stopping its own downward travel. As a result, a source of stress is removed from the lifter plate 258. By contrast, in some window regulator assemblies that incorporate a down stop that directly engages the lifter plate, the lifter plate can see increased stresses and can incur twisting. The twisting and other reactions of the lifter plate to the stresses during direct engagement with a down stop can contribute to BSR associated with the window regulator assembly. By stopping the downward travel of the lifter plate 258 using the ferrule 254 and the third cable 14c (ie. by achieving it without direct engagement between the lifter plate 258 and a down stop), the stresses on the lifter plate 20 are reduced, which, in turn, reduces a potential source of BSR for the window regulator assembly 252.

It will be understood that the ferrule 254 is but one example of a down stop engagement member that can be connected to the cable 14c for engagement with the down stop 260.

The lifter plate 258 itself may be similar to the lifter plate 20 (FIG. 1) except that the lifter plate 258 does not require bumpers to be incorporated therein, since it no longer directly engages the down stop 260.

Reference is made to FIG. 1. During operation of the window regulator system 10, the window 11 may either be moved upwards or downwards. During movement of the window upwards and particularly when the window 11 reaches its uppermost position, the cable 14a is under tension, while the cable 14b is relatively slack. This is because the drive motor cable drum, shown at 268, rotates in a direction which winds up the cable 14a thereon, and which lets out cable 14b therefrom. When this occurs, the slackness in the cable 14b increases the risk that it will leave the bearing surface shown at 269 (see FIG. 24) at the bottom of the window regulator assembly 10. Similarly, when the window 11 moves downwards and in particular when the window 11 bottoms out, there is tension in the cable 14b and relative slackness in the cable 14a, which increases the risk that the cable 14a will leave its associated pulley assembly 28. In order to reduce the risk of the cables 14a and 14b from leaving their respective pulley 34 and bearing surface 269, springs, such as the spring 160 shown in FIG. 14 may be incorporated into the connection between the cables 14a and 14c and their respective lifter plates 20 and 22, to keep the cables 14a and 14c in tension at all times. An alternative structure for reducing the likelihood of the cables 14a and 14b from leaving the pulley 34 and bearing surface 269 is the tensioner shown at 270 in FIG. 30.

Figure 31:
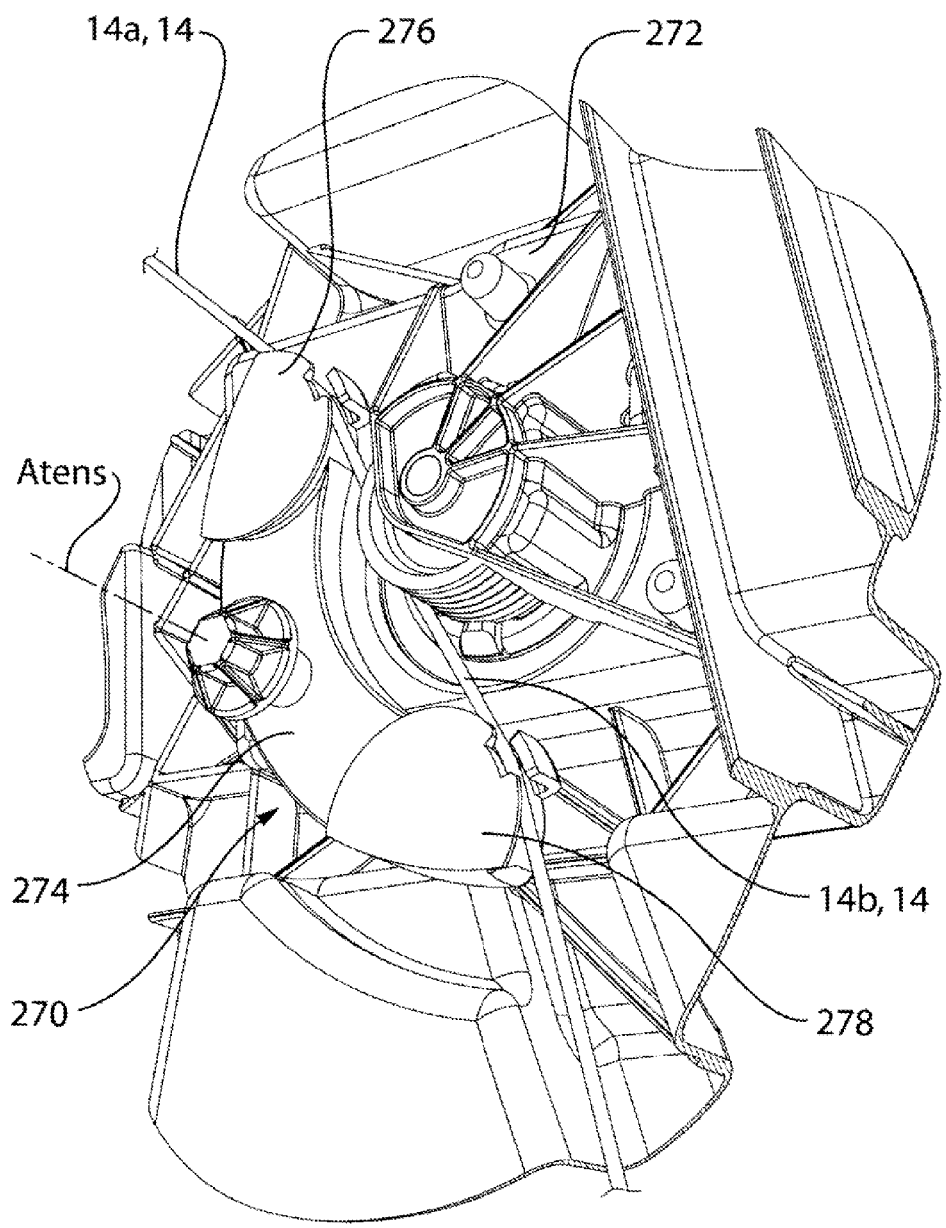
FIG. 31 is a magnified perspective view of the tensioner shown in FIG. 30.

The tensioner 270 is pivotally mounted to the carrier, shown at 272, about a pivot axis Atens. The tensioner 270 includes a tensioner body 274 with a first cable engagement member 276 and a second cable engagement member 278, which engage first and second lengths of cable, namely the cables 14a and 14b respectively (see FIG. 31).

The tensioner 270 may be configured so that no matter what position it is in, it causes some bending in both of the cables 14a and 14b. In this way, regardless of how much tension there is in either of the cables 14a and 14b, the cable 14a or 14b with the greater amount of tension applies a force to the respective cable engagement member 276 or 278, which causes the tensioner 270 to pivot, thereby urging the other cable engagement member 276 or 278 into the other cable 14a or 14b, thereby increasing the tension in that other cable 14a or 14b, until equilibrium is reached. Thus, the tensions in the cables 14a and 14b are always maintained generally in equilibrium and are always positive (ie. non-zero), thereby reducing the likelihood of a cable 14a or 14b leaving its respective pulley 34 or bearing surface 269.

As a result of the tensioner 270, springs, such as the spring 160 shown in FIG. 14, are not needed to mount the ends of the cables 14a, 14b or 14c to the lifter plates 22 and 20. By eliminating the springs, such as the spring 160, the height of the lifter plates 20 and 22 can be reduced, which shortens the overall height of the window regulator assembly required to provide a given amount of travel to the vehicle window 11.

Figure 30:
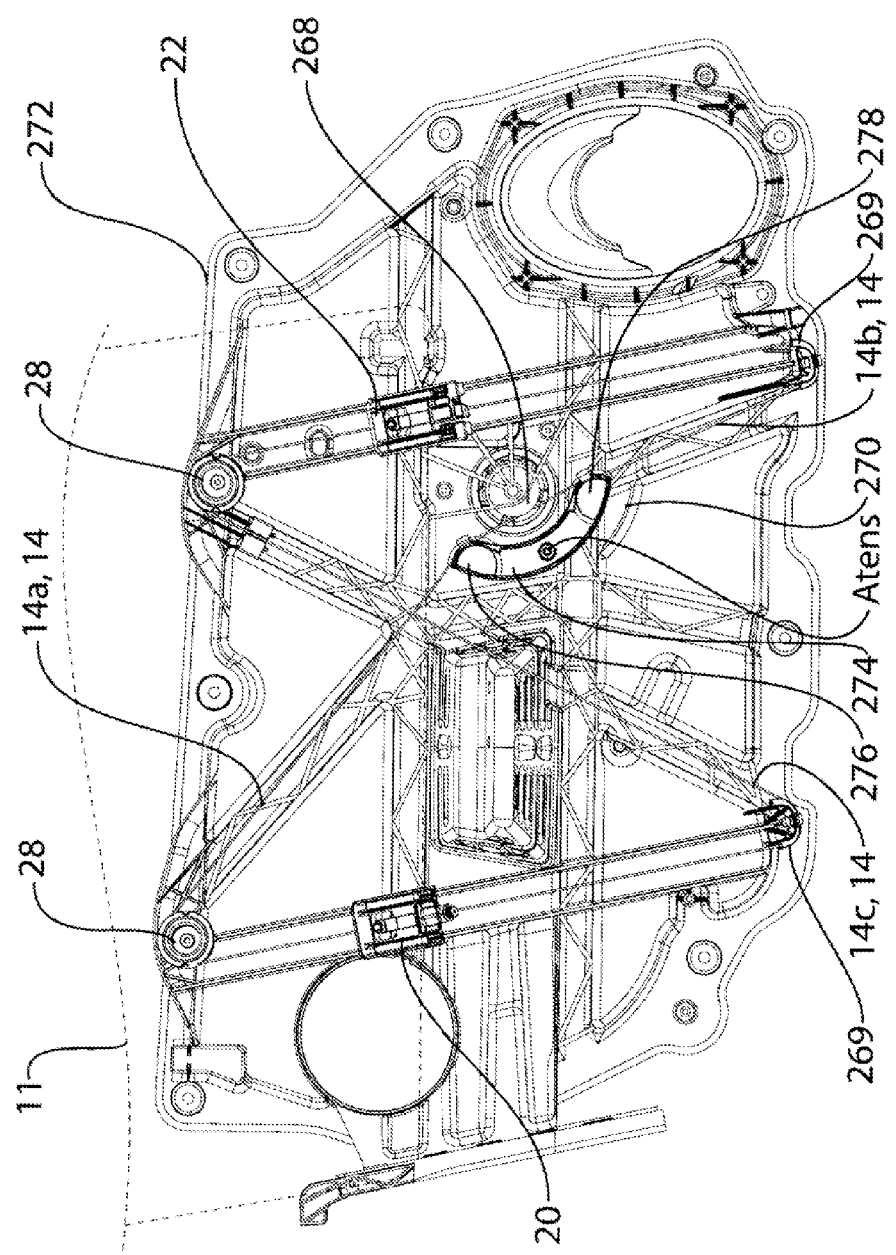
FIG. 30 is a perspective view of a window regulator system including a tensioner in accordance with another embodiment of the present invention.

Referring to FIG. 30, the first cable engagement member 276 is configured to transmit force from the cable 14a along a first moment arm D1 relative to the pivot axis Atens, and is configured to transmit force from the cable 14b along a second moment arm D2 relative to the pivot axis Atens. The first and second moment arms D1 and D2 may be approximately equal to each other. As a result, the force that is developed at the first cable engagement member 276 has the same magnitude as the force developed at the second cable engagement member 278. Accordingly, the tension developed in the first cable 14a is approximately the same as the tension developed in the second cable 14b. It will be appreciated that the first and second cable engagement members 276 and 278 may be configured to provide individually unique moment arms relative to the pivot axis Atens, thereby providing different tensions in the cables 14a and 14b.

Figure 32:
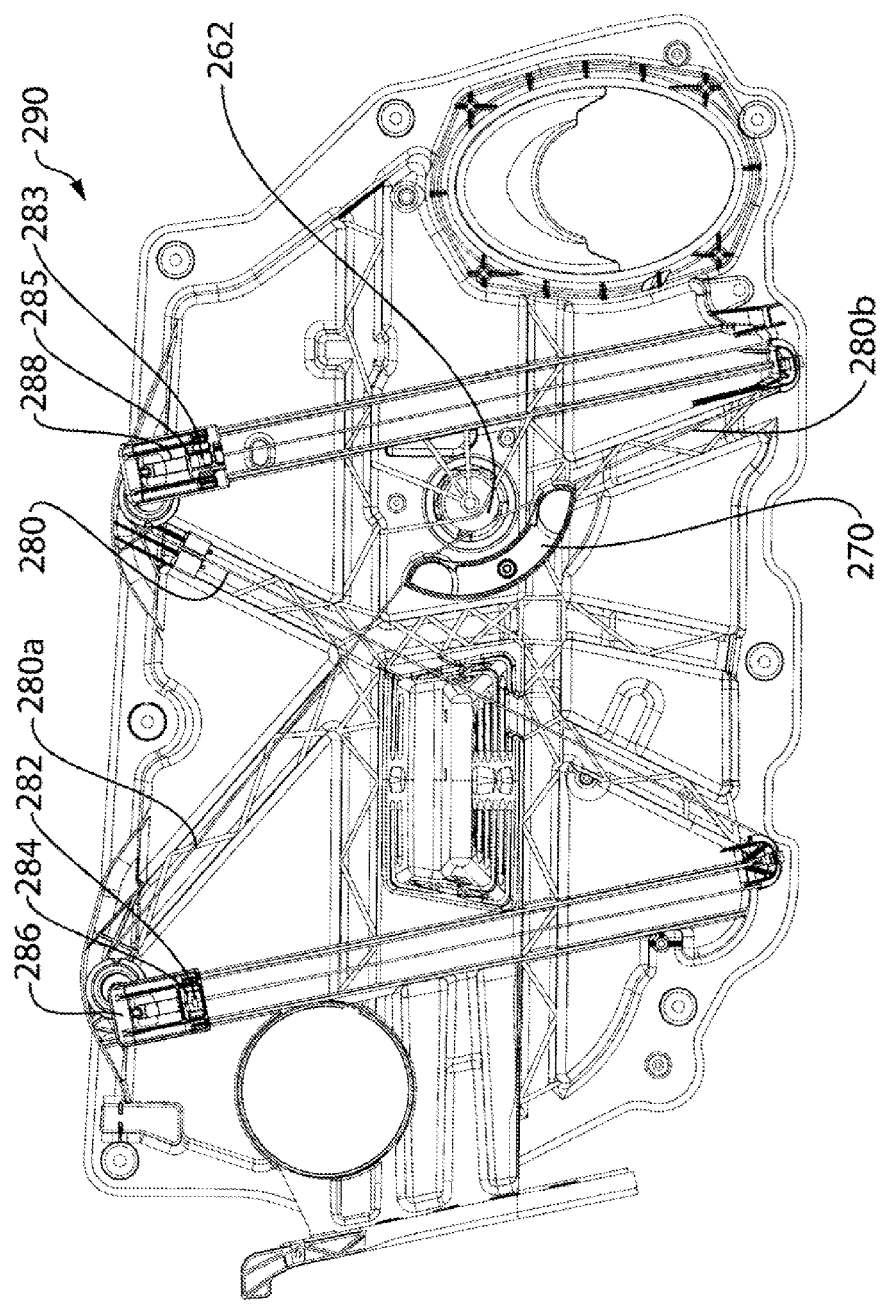
FIG. 32 is perspective view of a single-cable window regulator system in accordance with another embodiment of the present invention.

Another advantage to eliminating the need for springs when mounting the ends of the cables 14a and 14b to the lifter plates 20 and 22, is that the three cables 14a, 14b and 14c can be replaced by a single cable 280 (see FIG. 32) that has both of its ends connected to the drive motor cable drum 262. The cable 280 may include a first ferrule 282 and a second ferrule 283, which are mounted at first and second selected positions along the length of the cable 280 for receipt in first and second ferrule receptacles 284 and 285 in the lifter plates shown at 286 and 288 (FIG. 32). In the embodiment shown in FIG. 32, the first cable engagement member 276 on the tensioner 270 engages a first length of cable, namely the portion 280a of the cable 280 between the drive motor 12 and the first lifter plate 286, and the second cable engagement member 278 on the tensioner 270 engages a second length of cable, namely the portion 280b of the cable 280 between the drive motor 12 and the second lifter plate 288.

Figure 34:
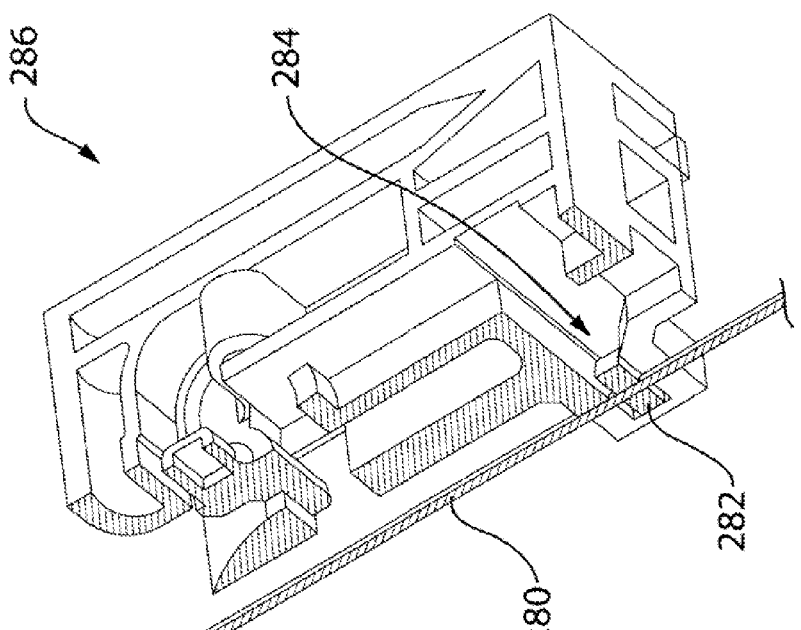
FIG. 34 is a magnified sectional perspective view of the lifter plate shown in FIG. 33.
Figure 33:
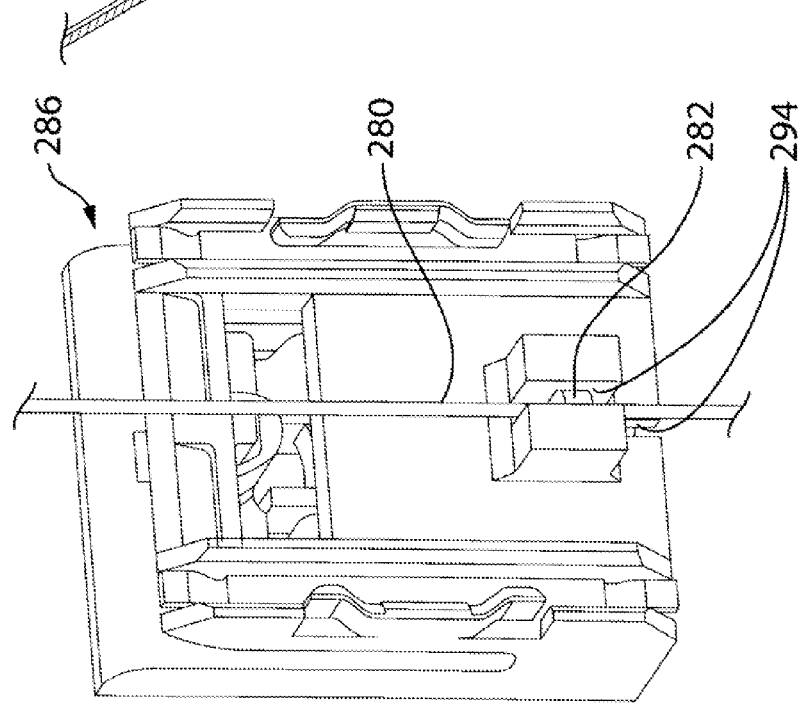
FIG. 33 is a magnified perspective view of a lifter plate shown in FIG. 32.

The cable 280 may be installed in the lifter plates 286 and 288 in any suitable way. An exemplary installation of the cable 280 in the lifter plate 286 is illustrated in FIGS. 34, 35 and 36. A user slides the cable 280 into the groove shown at 294 in FIG. 33, so that the cable is positioned as shown in FIG. 35. The cable 280 is then advanced (ie. moved in the direction of arrow ADV) so that the ferrule 282 passes through the aperture shown at 296 in FIG. 36. The ferrule 282 can then be moved into position in the ferrule receptacle 284 into the position shown in FIG. 34. The ferrule 282 may be held in the ferrule receptacle 284 by means of a press fit 284 or by some other suitable means. Alternatively the ferrule 282 may remain in the ferrule receptacle 284 simply by means of the orientation of the cable 280 during use. The cable 280 may be installed in the lifter plate 288 in the same way as it is installed in the lifter plate 286.

By using a single cable 280 (FIG. 32) instead of three separate cables 14a, 14b and 14c (FIG. 1), the amount of 'tolerance stack-up' is reduced in the window regulator system shown at 290 (FIG. 32), relative to a three-cable system because each cable represents a potential source of dimensional error.

A three-cable system, if not assembled and manufactured properly, can exhibit bias in the sense that the two lifter plates may not be aligned correctly in the vertical positions on their respective rails. As a result, the vehicle window can chutter as it is moved. Because a single-cable window regulator system, such as the window regulator system 290, has reduced tolerance stack-up, there is a reduced likelihood of the lifter plates being misaligned with each other height-wise and so the likelihood of chutter during movement of the vehicle window is reduced.

Figure 37:
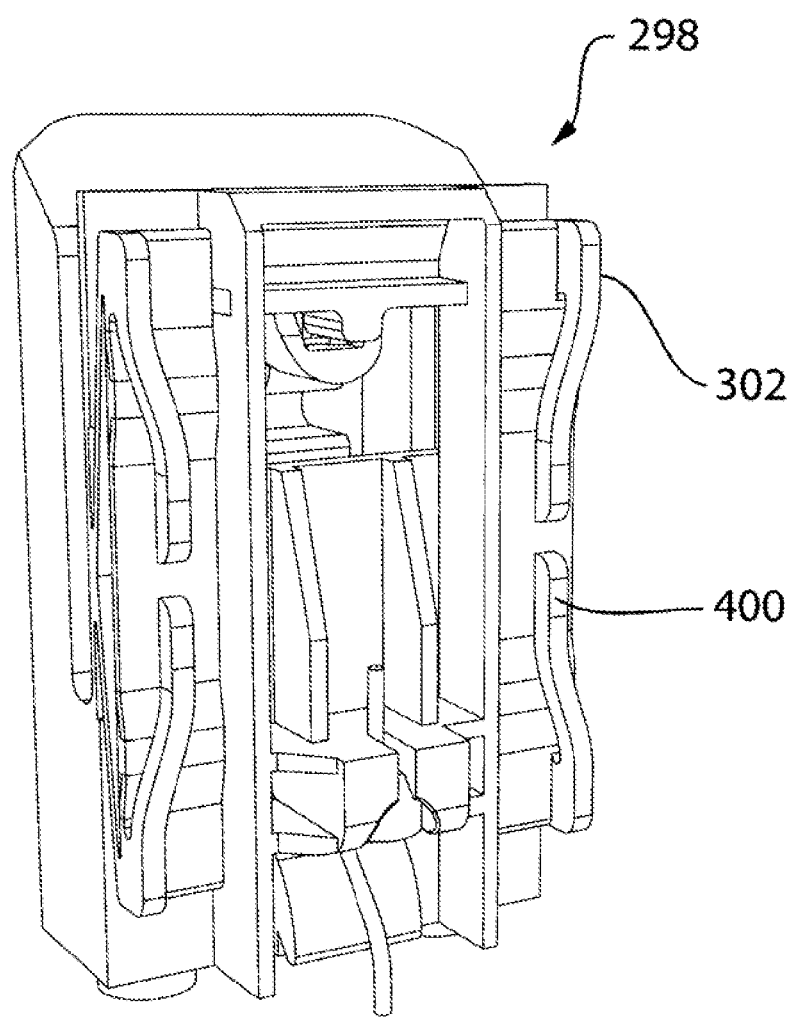
FIG. 37 is a perspective view of a lifter plate in accordance with another embodiment of the present invention.

Reference is made to FIG. 37, which shows a lifter plate 298, with a different configuration for lateral guide surface engagers, shown at 300 and a different configuration for lateral guide surface engager biasing members, shown at 302, in accordance with another embodiment of the present invention.

While the above description constitutes a plurality of embodiments of the present invention, it will be appreciated that the present invention is susceptible to further modification and change without departing from the fair meaning of the accompanying claims.

The invention claimed is:

1. A combination of a carrier and a pulley assembly, wherein the pulley assembly includes a pulley having an associated pulley rotation axis, a pulley bearing member that supports the pulley for rotation about the pulley rotation axis and a pulley fastener, wherein the pulley fastener connects the pulley assembly to the carrier on only one side of the pulley, wherein the pulley bearing member includes a pulley assembly bending load bearing surface,
  wherein the carrier is mountable to a vehicle, wherein the carrier includes a pulley fastener mount for receiving the pulley fastener, wherein the carrier further includes a carrier bending load bearing surface that contacts the pulley assembly bending load bearing surface, wherein the pulley assembly bending load bearing surface is generally conical about the pulley rotation axis and is inclined relative to the pulley rotation axis, and the carrier bending load bearing surface increases in diameter in a direction along the pulley rotation axis towards the pulley and wherein the carrier bending load bearing surface is generally conical about the pulley rotation axis.

2. A combination of a carrier and pulley assembly as claimed in claim 1, wherein the pulley assembly bending load bearing surface and the carrier bending load bearing surface each have an angle of approximately 45 degrees relative to the pulley rotation axis.

3. A combination of a carrier and pulley assembly as claimed in claim 1, wherein the pulley includes a pulley assembly thrust bearing surface, and wherein the carrier includes a carrier thrust bearing surface that engages the pulley assembly thrust bearing surface.

4. A combination of a carrier and pulley assembly as claimed in claim 3, wherein the pulley has a radial dimension and wherein the pulley assembly thrust bearing surface is small relative to the radial dimension to reduce frictional drag between the pulley and the carrier during rotation of the pulley.

* * * * *